US011224908B2

(12) United States Patent
Yasutomi et al.

(10) Patent No.: US 11,224,908 B2
(45) Date of Patent: Jan. 18, 2022

(54) CUTTING METHOD USING A STAMPING PRESS

(71) Applicant: NIPPON STEEL & SUMITOMO METAL CORPORATION, Tokyo (JP)

(72) Inventors: Takashi Yasutomi, Tokyo (JP); Takashi Matsuno, Tokyo (JP); Tohru Yoshida, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 565 days.

(21) Appl. No.: 15/762,824

(22) PCT Filed: Sep. 28, 2016

(86) PCT No.: PCT/JP2016/078637
§ 371 (c)(1),
(2) Date: Mar. 23, 2018

(87) PCT Pub. No.: WO2017/057466
PCT Pub. Date: Apr. 6, 2017

(65) Prior Publication Data
US 2018/0272408 A1 Sep. 27, 2018

(30) Foreign Application Priority Data
Sep. 28, 2015 (JP) .............................. JP2015-189830

(51) Int. Cl.
*B21D 28/04* (2006.01)
*B21D 28/34* (2006.01)
(Continued)

(52) U.S. Cl.
CPC .............. *B21D 28/34* (2013.01); *B21D 22/02* (2013.01); *B21D 24/16* (2013.01); *B21D 28/16* (2013.01);
(Continued)

(58) Field of Classification Search
CPC ........ B21D 28/34; B21D 24/16; B21D 28/16; B21D 35/006; B21D 22/02; B21D 43/287;
(Continued)

(56) References Cited

U.S. PATENT DOCUMENTS

| 10,384,296 B2 * | 8/2019 | Spinella ............. B23K 11/3009 |
| 2013/0086961 A1 * | 4/2013 | Yablochnikov ........ B23K 20/06 72/56 |
| 2015/0217395 A1 * | 8/2015 | Spinella .................. B23K 11/11 219/86.22 |

FOREIGN PATENT DOCUMENTS

| EP | 0934132 B1 * | 6/2002 | ........... B21D 39/031 |
| JP | 60-216931 A | 10/1985 | |
(Continued)

OTHER PUBLICATIONS

Korean Office Action dated Apr. 22, 2019, issued in corresponding Korean Patent Application No. 10-2018-7009412 with partial English translation.
(Continued)

*Primary Examiner* — Adam J Eiseman
*Assistant Examiner* — Amer Islam
(74) *Attorney, Agent, or Firm* — Birch, Stewart, Kolasch & Birch, LLP

(57) ABSTRACT

A cutting method using a stamping press according to the present disclosure is a method to cut a workpiece that is configured from a first metal sheet and a second metal sheet joined at a weld portion and that has a heat-affected zone around the weld portion, in which the workpiece is cut using a punch. The punch includes a flat portion and a projecting portion projected more toward the workpiece than a flat portion of the punch. The workpiece is positioned with respect to the punch at a position such that the projecting portion starts cutting at least at one out of the heat-affected
(Continued)

zone or the weld portion before the flat portion cuts the workpiece. The workpiece is then cut by moving the punch and a die relative to each other in this state of positioning so as to shear across the weld portion on the workpiece.

8 Claims, 20 Drawing Sheets

(51) Int. Cl.
  *B23K 31/00* (2006.01)
  *B21D 35/00* (2006.01)
  *B21D 28/16* (2006.01)
  *B23D 35/00* (2006.01)
  *B21D 24/16* (2006.01)
  *B21D 22/02* (2006.01)
  *B23D 15/08* (2006.01)

(52) U.S. Cl.
  CPC ......... *B21D 35/006* (2013.01); *B23D 35/001* (2013.01); *B23K 31/00* (2013.01); *B23D 15/08* (2013.01)

(58) Field of Classification Search
  CPC ........ B21D 37/10; B21D 28/02; B21D 28/14; B23D 35/001; B23D 15/08; B23D 31/002; B23D 31/003; B23D 31/004; B23D 31/005; B23D 31/006; B23D 31/007; B23K 31/00; B26D 2001/006
  See application file for complete search history.

(56) References Cited

FOREIGN PATENT DOCUMENTS

| JP | 6-47459 A | | 2/1994 |
|---|---|---|---|
| JP | 2006-224151 A | | 8/2006 |
| JP | 2006224151 A | * | 8/2006 |
| JP | 2007-283339 A | | 11/2007 |
| JP | 2007283339 A | * | 11/2007 |
| JP | 2008-266721 A | | 11/2008 |
| JP | 210-36195 A | | 2/2010 |
| JP | 2011-45900 A | | 3/2011 |
| JP | 2014-111283 A | | 6/2014 |
| WO | WO 2014/065106 A1 | | 5/2014 |

OTHER PUBLICATIONS

Abe et al., "Punch Processing of Steel Plate that has been Die Quenched by Punch Having Micro-rounded Corner Portions", The proceedings of Japanese Joint Conference for the Technology of Plasticity, vol. 63, p. 338, total 9 pages.
International Search Report for PCT/JP2016/078637 dated Dec. 27, 2016.
Written Opinion of the International Searching Authority for PCT/JP2016/078637 (PCT/ISA/237) dated Dec. 27, 2016.
Indian Office Action dated Nov. 11, 2019, issued in Indian Patent Application No. 201817011900.

* cited by examiner

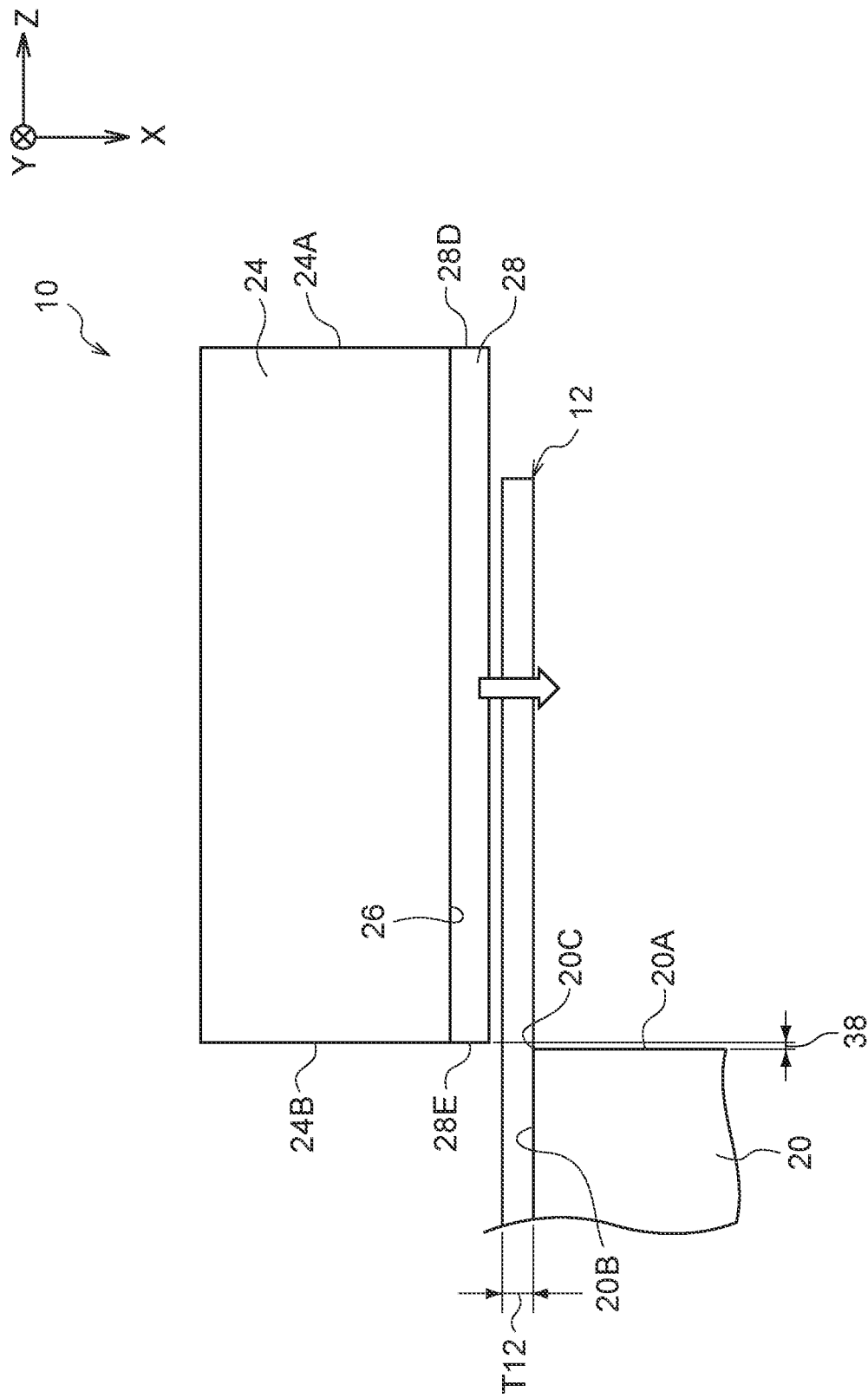

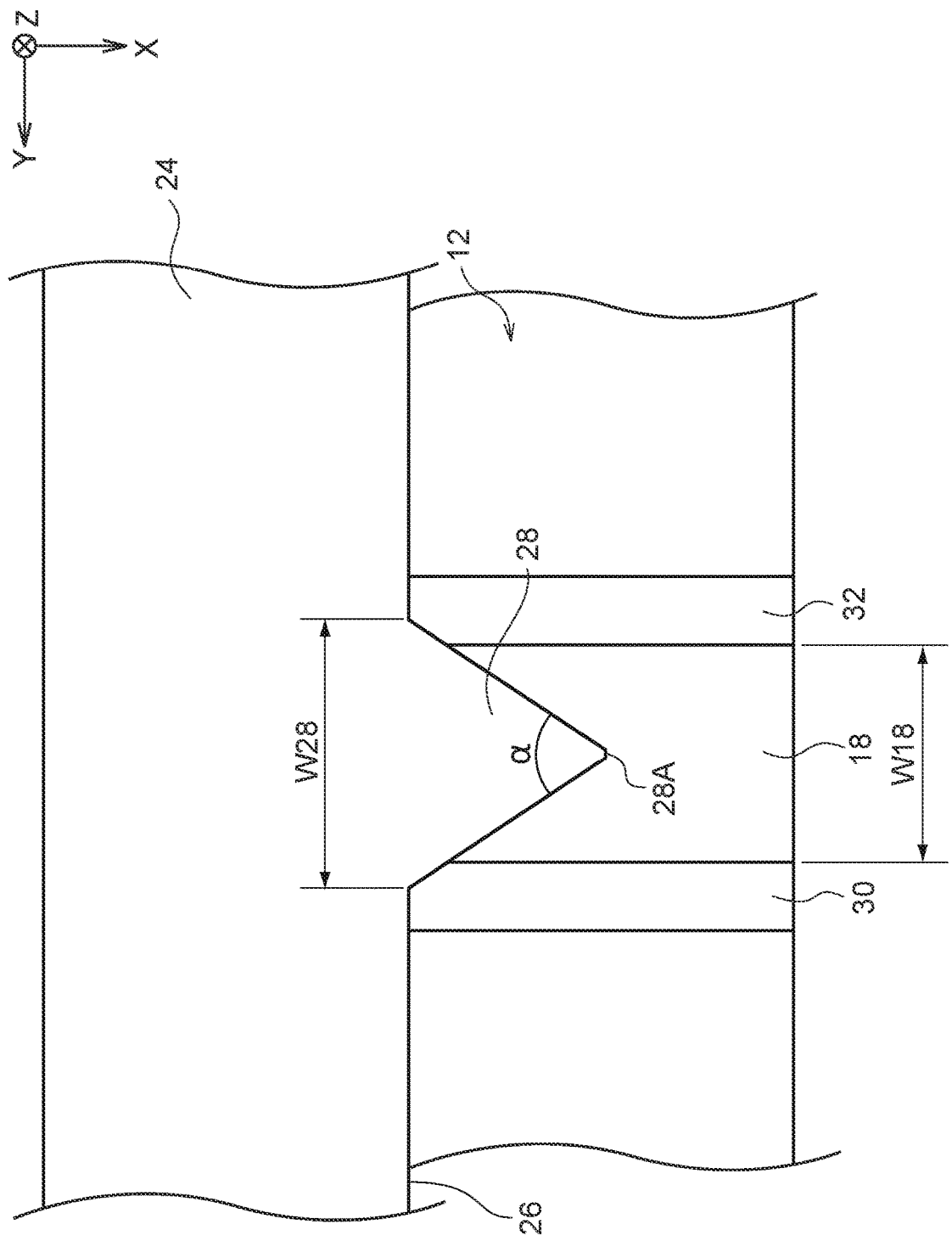

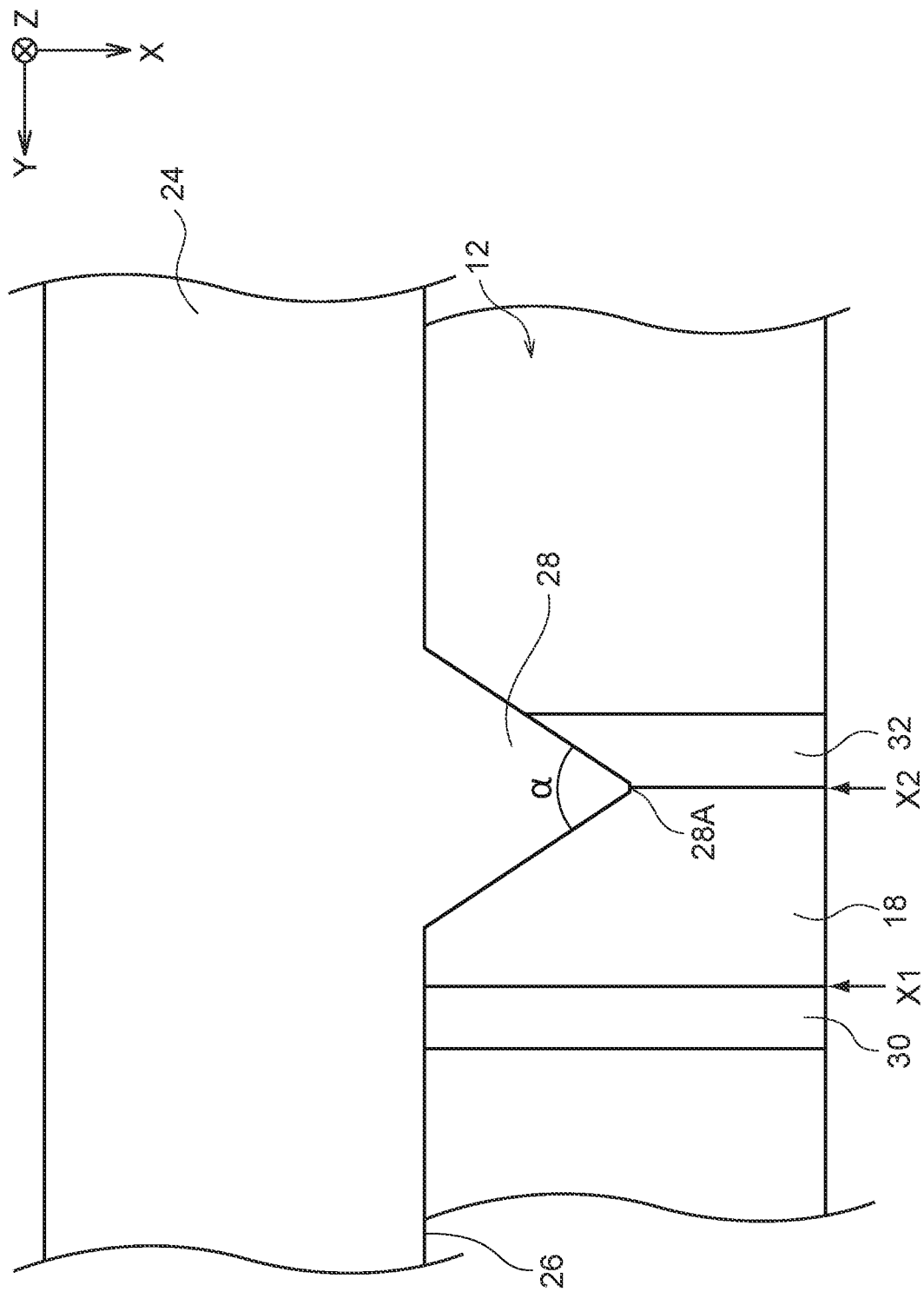

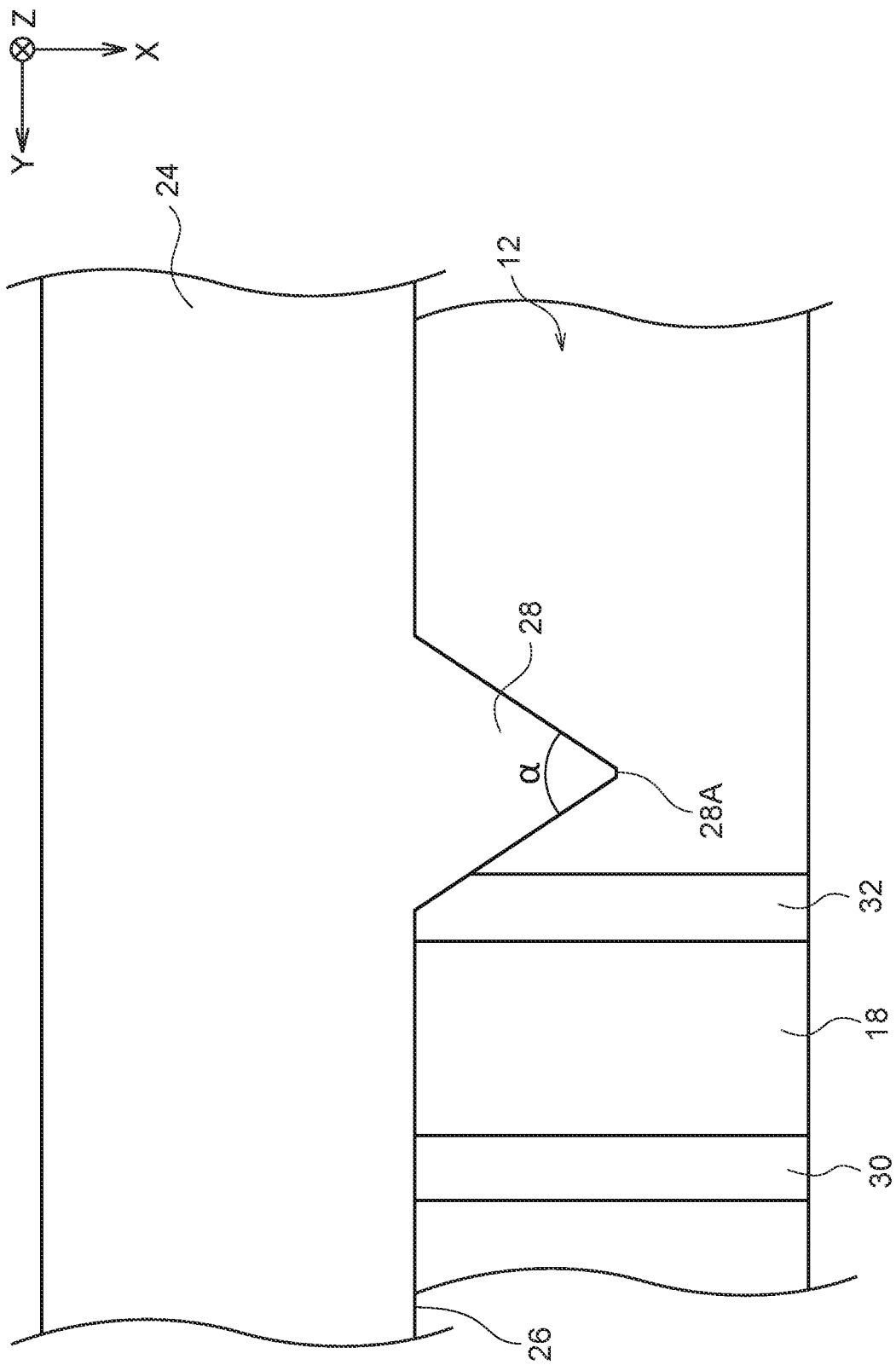

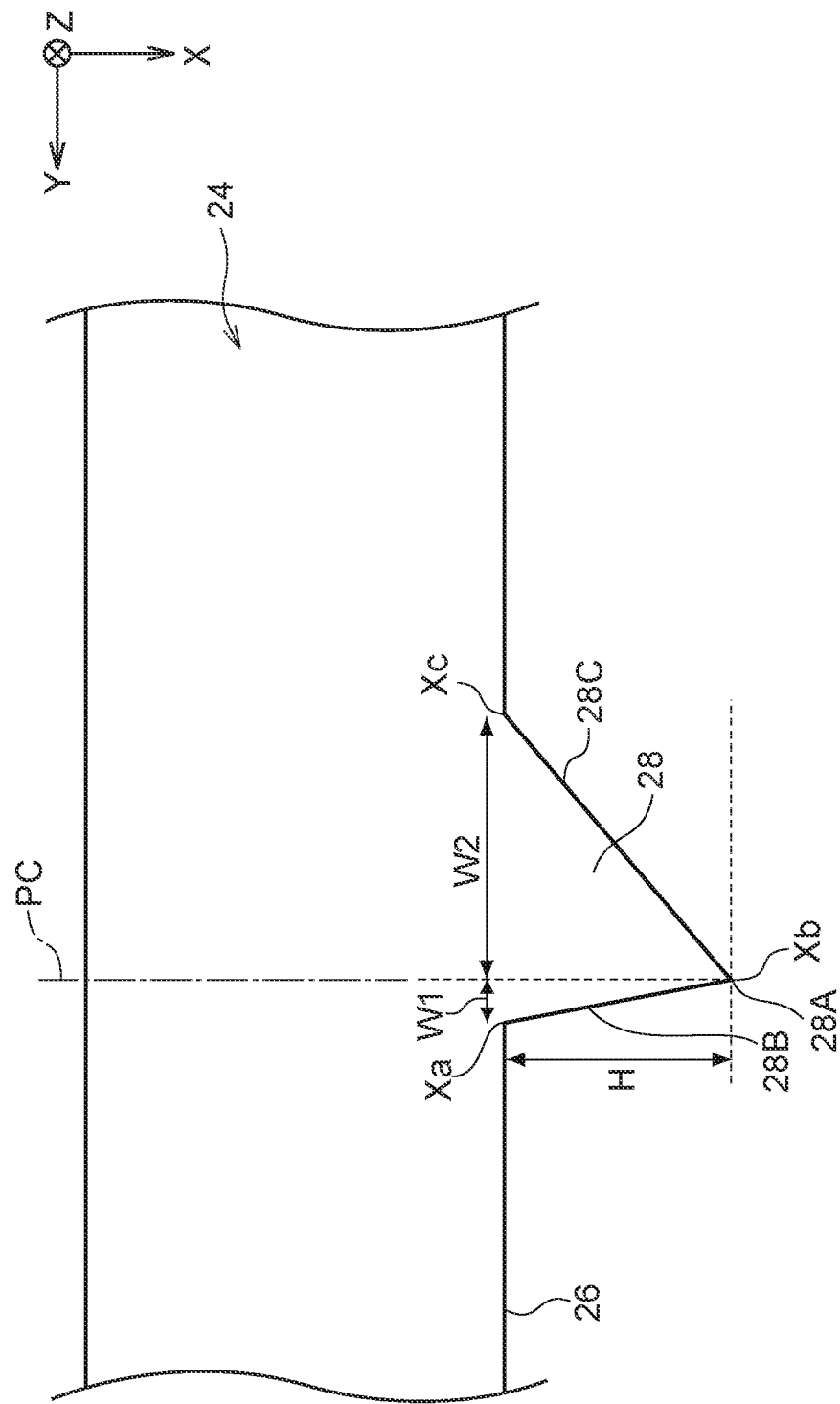

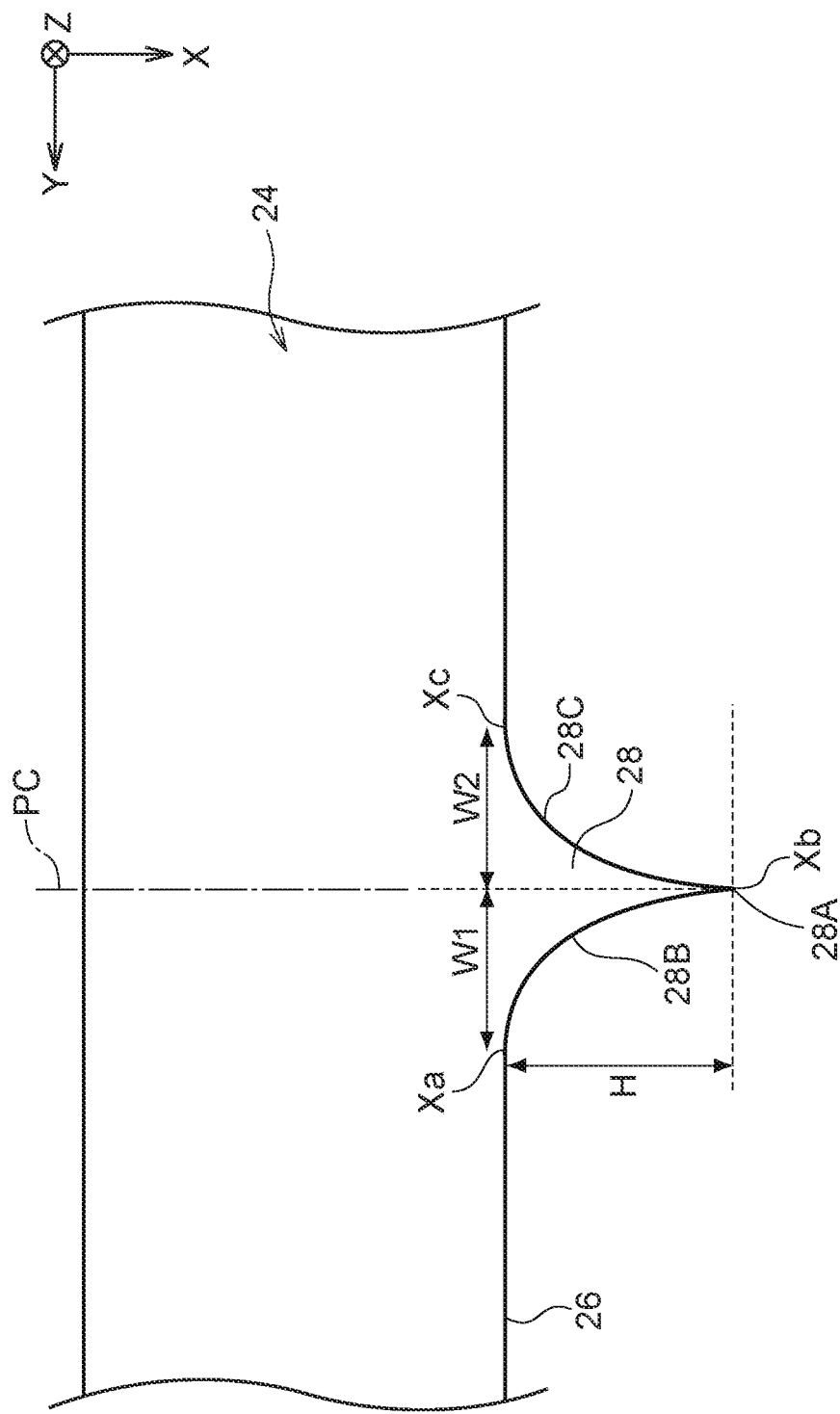

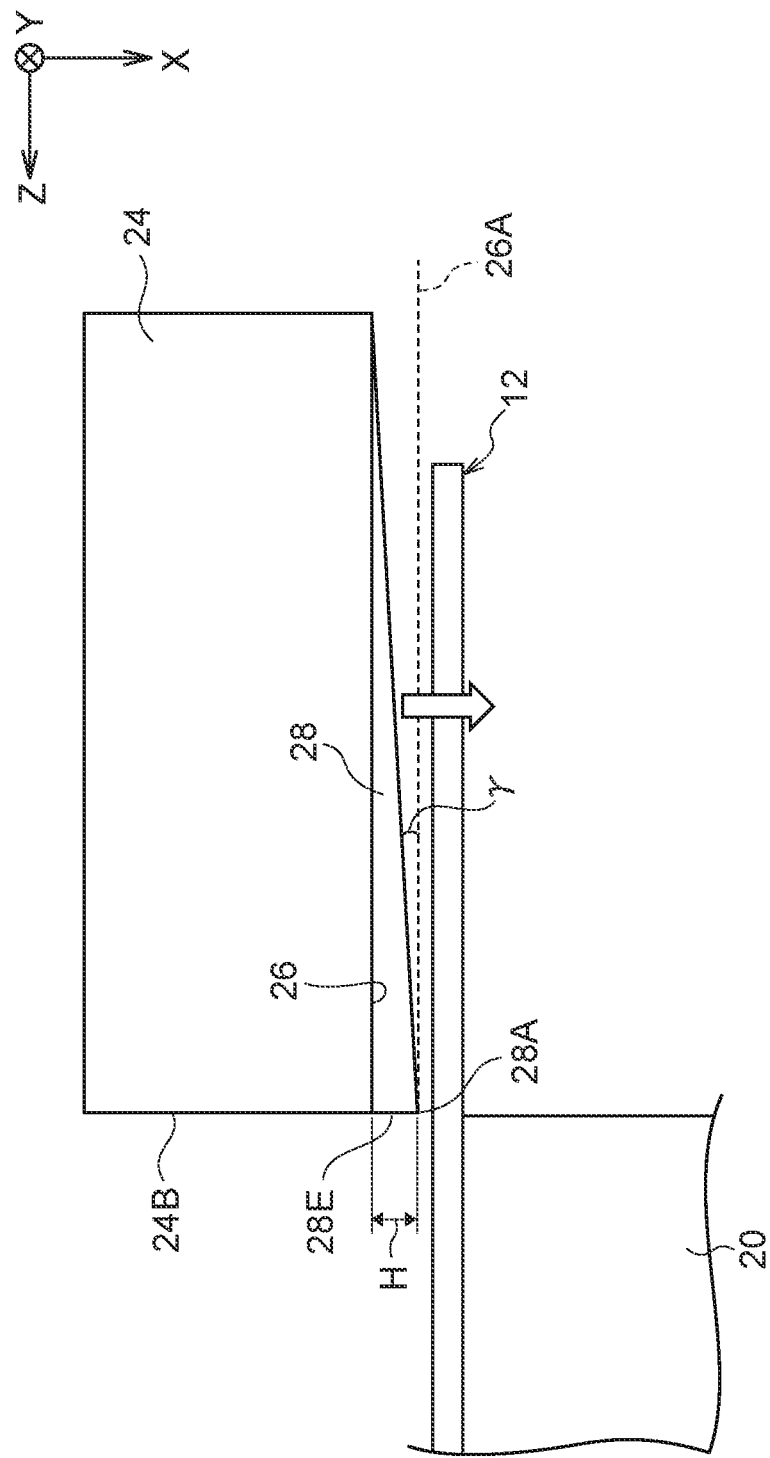

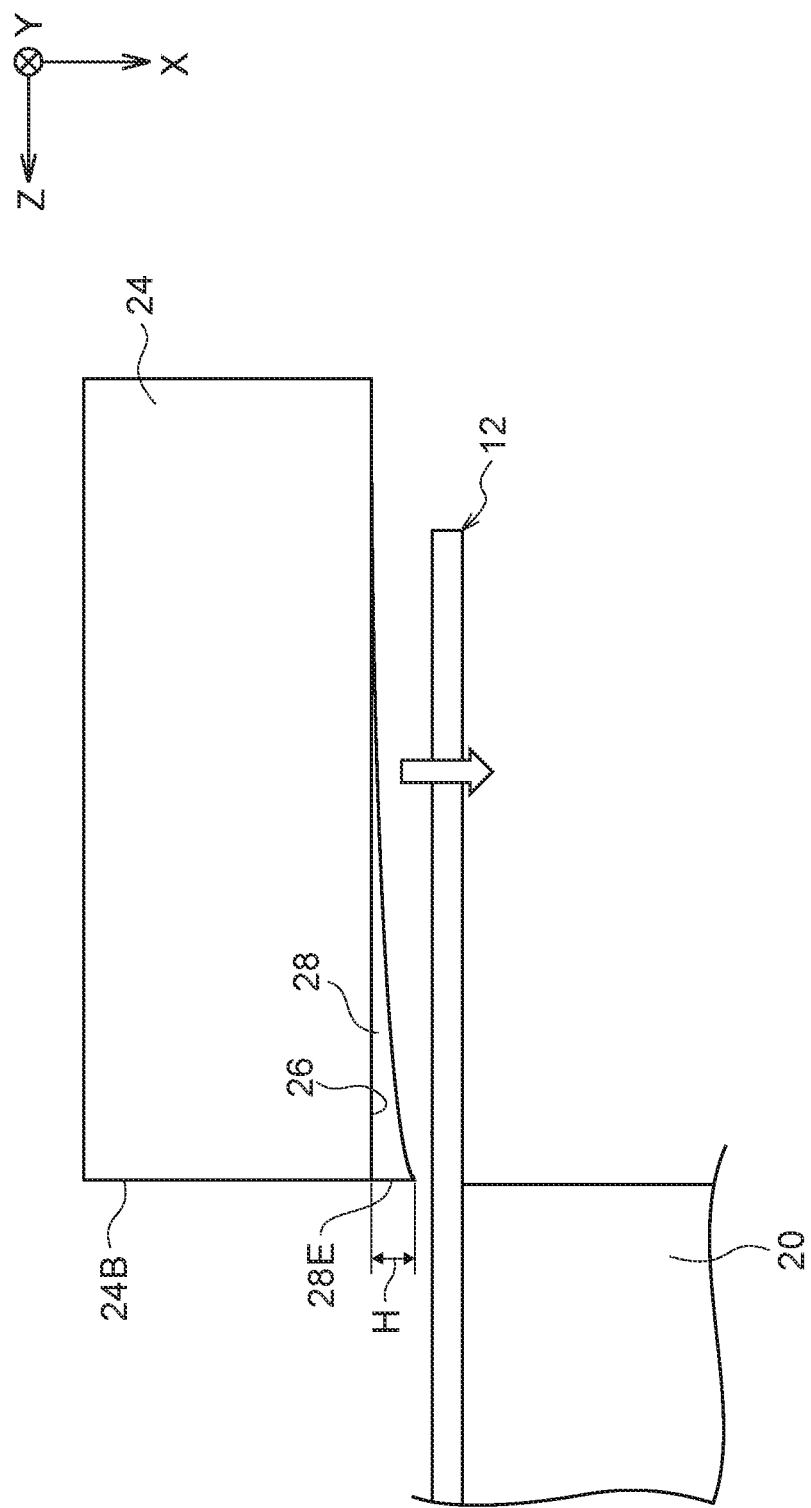

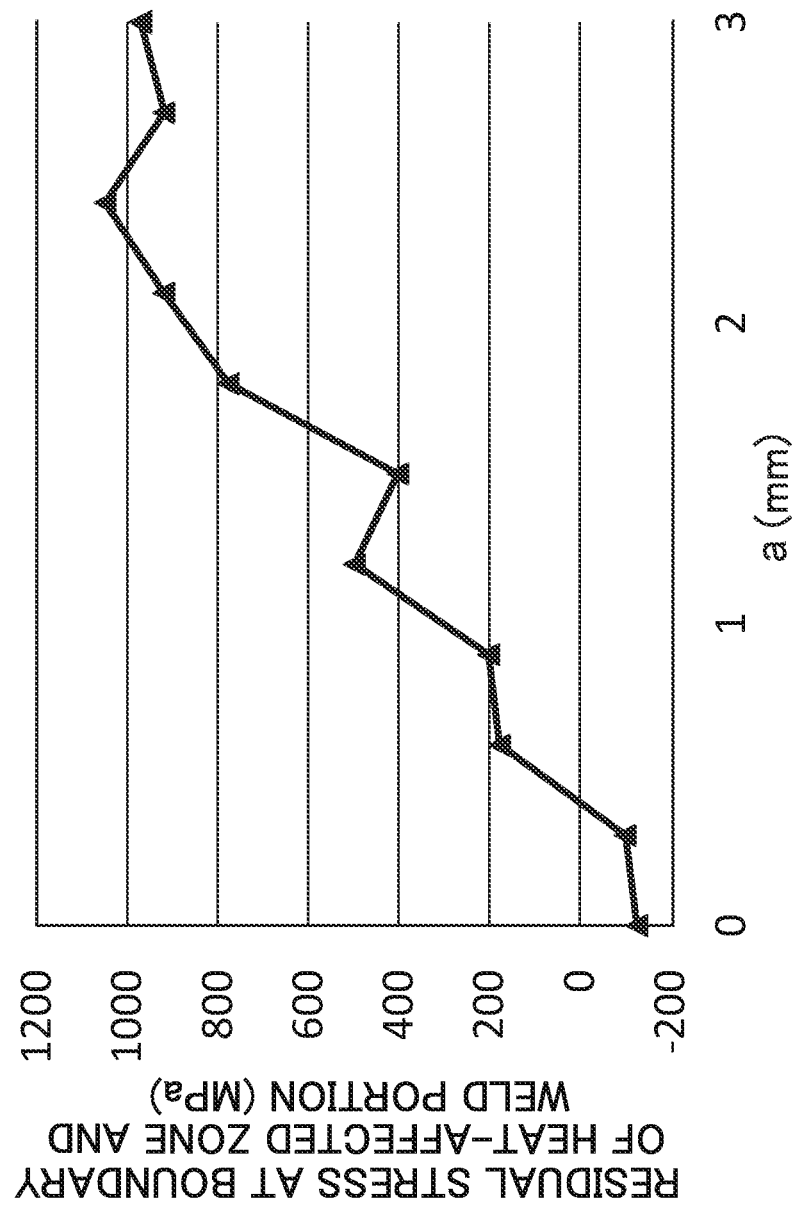

CUTTING METHOD USING A STAMPING PRESS

TECHNICAL FIELD

The present disclosure relates to a cutting method that uses a stamping press to shear and cut a workpiece configured from a first metal sheet and a second metal sheet joined at a weld portion, so as to cut across the weld portion.

BACKGROUND ART

Shearing, such as when blanking or piercing a thin metal sheet using a press, is widely employed in the processing of electrical devices, automobile components, and the like due to shearing being highly productive and having low machining costs. However, when such shearing is applied to high strength steel sheets with a tensile strength exceeding 1000 MPa, there is a problem that the residual stress is high at edges of blanks, hydrogen embrittlement cracking (also referred to as season cracking or delayed fracture) is liable to occur, and there is a deterioration in fatigue properties.

Moreover, it is known that when a workpiece configured from the same type or different types of metal sheet joined by welding is sheared, the hydrogen embrittlement resistance and fatigue properties of the sheared faces of the weld portion and the heat-affected zone (referred to below as "HAZ portion") deteriorate.

A die roll formed by the workpiece being pressed in by the punch, a shear face formed by the workpiece being drawn into a gap between the punch and die (referred to below simply as "clearance") and locally extended, a fracture face formed by the workpiece fracturing partway through shear face forming, and a burr generated on the blanking back face of the workpiece, are present on the blank edge faces of the workpiece after blanking.

Normally, the clearance and tool shape are adjusted so as to achieve prescribed amounts of die roll, shear face, fracture face, and burr generation at the blank edge faces, or to achieve improvements to the edge face properties after processing with respect to stretch flange formability, fatigue properties, hydrogen embrittlement resistance, and the like.

For example, Japanese Patent Application Laid-Open (JP-A) No. 2006-224151 (referred to below as Patent Document 1) discloses being able to reduce work hardening and residual tensile stress at edge faces after processing by using tools including curved blades in which the tip portion of a cutting blade portion of the punch and/or the die has a protruding profile, with a predetermined radii of curvature and blade shoulder angles, and with a clearance of 25% or less.

Moreover, it is reported in "The proceedings of Japanese Joint Conference for the Technology of Plasticity", volume 63, page 338 (referred to below as Non-Patent Document 1), that the residual tensile stress of blanking faces is reduced by shearing under high compressional stress with a clearance to thickness ratio of not greater than 1%. A piercing method having excellent burring properties is introduced in JP-A No. 2014-111283 (referred to below as Patent Document 2). In this method, the angle between a direction of excellent ductility and a blade edge direction of a wedge shaped punch was set at not greater than 10 degrees.

SUMMARY OF INVENTION

Technical Problem

The hydrogen embrittlement properties and fatigue properties can be improved by controlling shearing so as to reduce residual stress at sheared faces (see, for example, Patent Document 1 and Non-Patent Document 1). However, it is difficult to produce blanking faces having uniform end face characteristics when formed by the method of Patent Document 1. Namely, in cases in which the punch shape has a uniform cutting line direction, cracking is liable to occur at weld portions and heat-affected zones where residual stress is high and ductility and toughness is low at the sheared faces.

However, in cases in which the clearance to thickness ratio is not greater than 1%, as in the method of Non-Patent Document 1, galling occurs due to slight punch misalignment. Moreover, there is a problem that when the clearance changes due to wear at the side faces of the punch and die, the residual stress is increased at sheared faces, and sufficient improvement effect for fatigue properties and sufficient improvement effect for hydrogen embrittlement resistance is no longer obtainable.

An object of the present disclosure is to provide a cutting method using a stamping press that enables a reduction to be made in residual stress at sheared faces of at least one of a weld portion or a heat-affected zone of a workpiece.

Solution to Problem

A cutting method using a stamping press according to a first aspect of the present disclosure is employed on a workpiece that is configured from a first metal sheet and a second metal sheet joined at a weld portion and that has a heat-affected zone around the weld portion. The cutting method includes positioning the workpiece at a position relative to a punch that includes a projecting portion projected more toward the workpiece than a flat portion of the punch such that the projecting portion starts to cut at least at one out of the heat-affected zone or the weld portion before the flat portion cuts the workpiece, and cutting the workpiece by moving the punch and a die relative to each other at the positioned position so as to shear across the weld portion on the workpiece.

According to the present disclosure, residual stress can be reduced at sheared faces of the weld portion or the heat-affected zone of a workpiece.

BRIEF DESCRIPTION OF DRAWINGS

FIG. 8 is a schematic side view to explain a projecting portion according to the first exemplary embodiment, as viewed along the Y direction of FIG. 1.

FIG. 10 is a schematic front view to explain a state in which a projecting portion of a punch according to the first exemplary embodiment shears a portion of a first heat-affected zone, a weld portion, and a portion of a second heat-affected zone.

FIG. 11 is a schematic front view to explain a state in which a projecting portion of a punch according to the first exemplary embodiment shears a portion of a weld portion and a second heat-affected zone.

FIG. 12 is a schematic front view to explain the projecting portion of a punch according to the first exemplary embodiment shearing a portion of the second heat-affected zone.

FIG. 13 is a schematic front view to explain a shape of a projecting portion according to a second exemplary embodiment.

FIG. 14 is a schematic front view to explain a shape of a projecting portion according to a third exemplary embodiment.

FIG. 18 is a schematic front view to explain a shape of a projecting portion according to a seventh exemplary embodiment.

FIG. 19 is a schematic front view to explain a shape of a projecting portion according to an eighth exemplary embodiment.

FIG. 20 is a graph illustrating residual stress at a second boundary against distance to the second boundary from a center of a cutting edge of a projecting portion.

DESCRIPTION OF EMBODIMENTS

First, the present inventors investigated shearing a workpiece configured from two types of rolled metal sheet welded and joined together, by shearing with a flat punch and die, and investigated the residual stress at the sheared faces. As a result, it was found that residual tensile stress similar to, or greater than, that of other portions (general portions) remained at weld portions and heat-affected zones.

At the weld portions and heat-affected zones, as a result of the heat input during welding, crystal grains increased in grain size and ductility and toughness deteriorated. There was accordingly a concern that cracks might readily occur at sheared faces when tensile stress from the shearing remains at the sheared face (blanking faces). Thus, cracks can be suppressed from occurring at the sheared faces and hydrogen embrittlement cracking can be suppressed by reducing the tensile stress remaining at the sheared faces of at least part of the weld portions or heat-affected zones.

The present inventors have then discovered that the generation of cracks and the generation of hydrogen embrittlement cracking can be effectively suppressed by providing a projecting portion projected from a punch, and shearing the workpiece by inserting the projecting portion into a region of at least part of a weld portion or a heat-affected zone of the workpiece before a flat portion. Next, description follows regarding a cutting method using a stamping press to implement this discovery.

First Exemplary Embodiment

Description follows regarding a first exemplary embodiment, with reference to the drawings.

Figure 1:
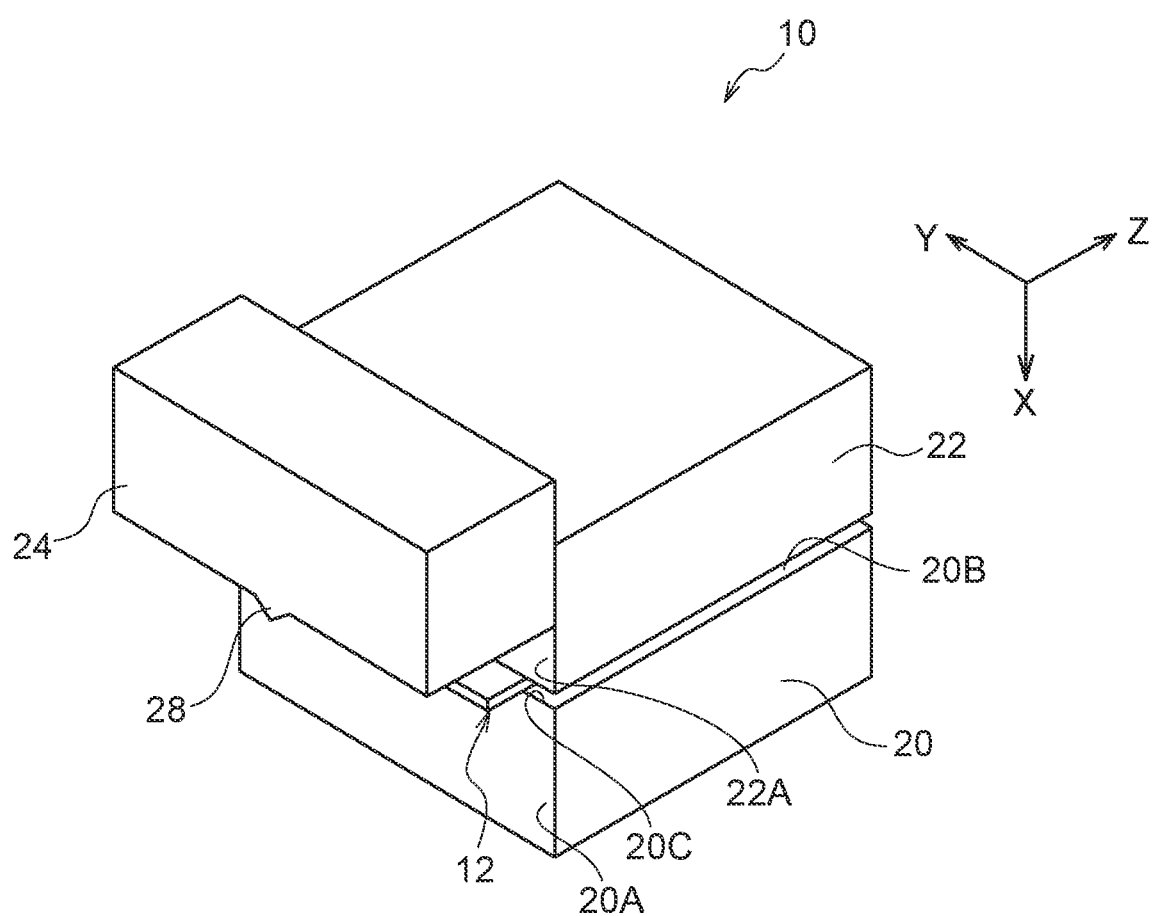
FIG. 1 is a schematic perspective view illustrating a cutting machine of a first exemplary embodiment.
Figure 2:
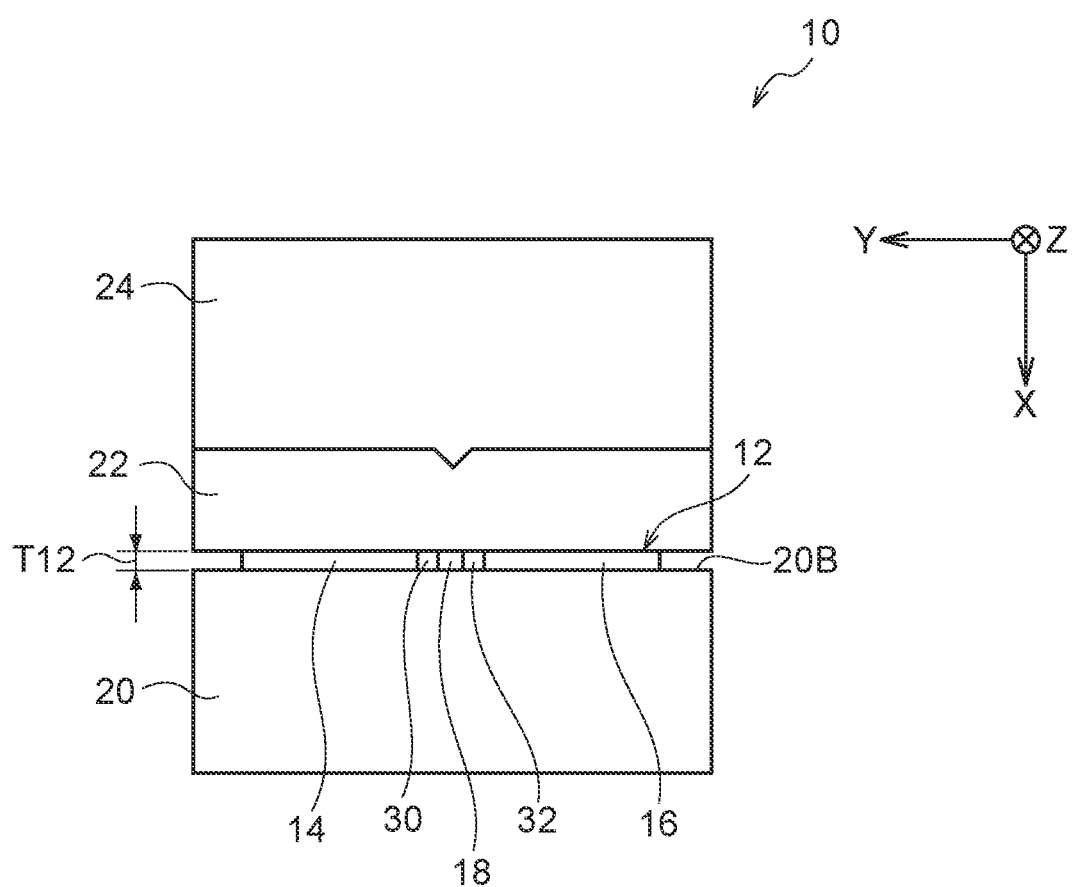
FIG. 2 is a schematic front view of a cutting machine of the first exemplary embodiment, as viewed along the Z direction of FIG. 1.
Figure 3:
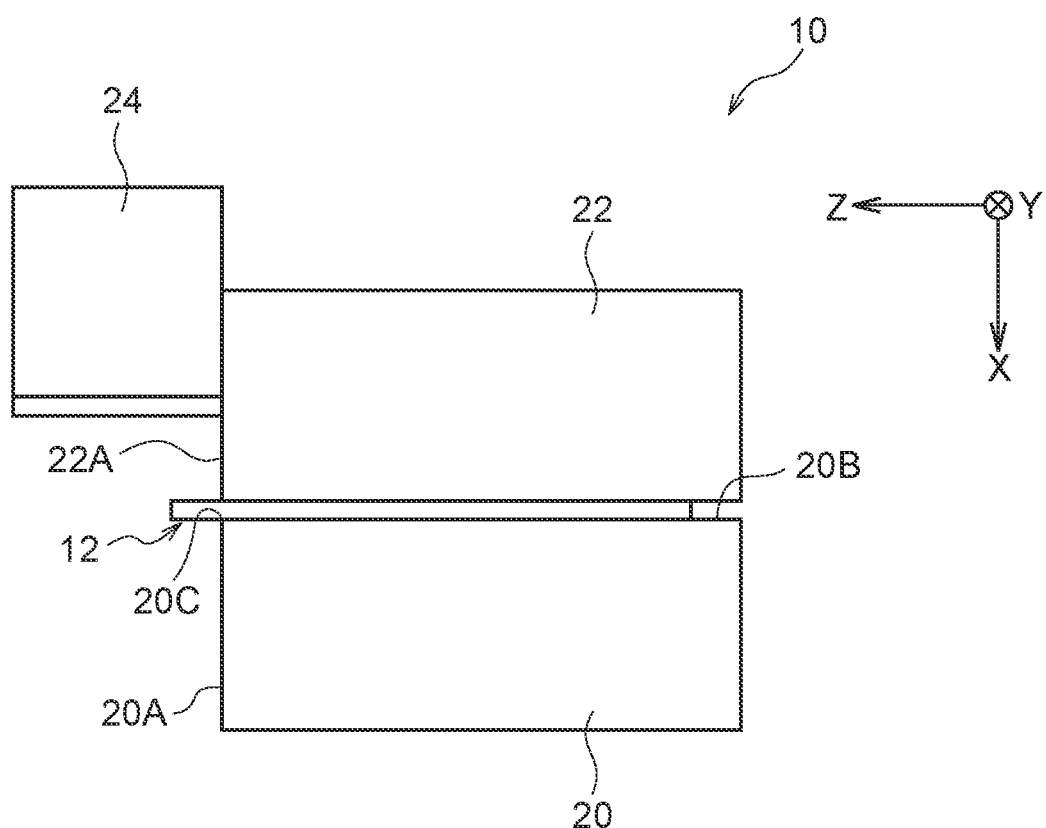
FIG. 3 is a schematic side view of a cutting machine of the first exemplary embodiment, as viewed along the Y direction of FIG. 1.
Figure 4:
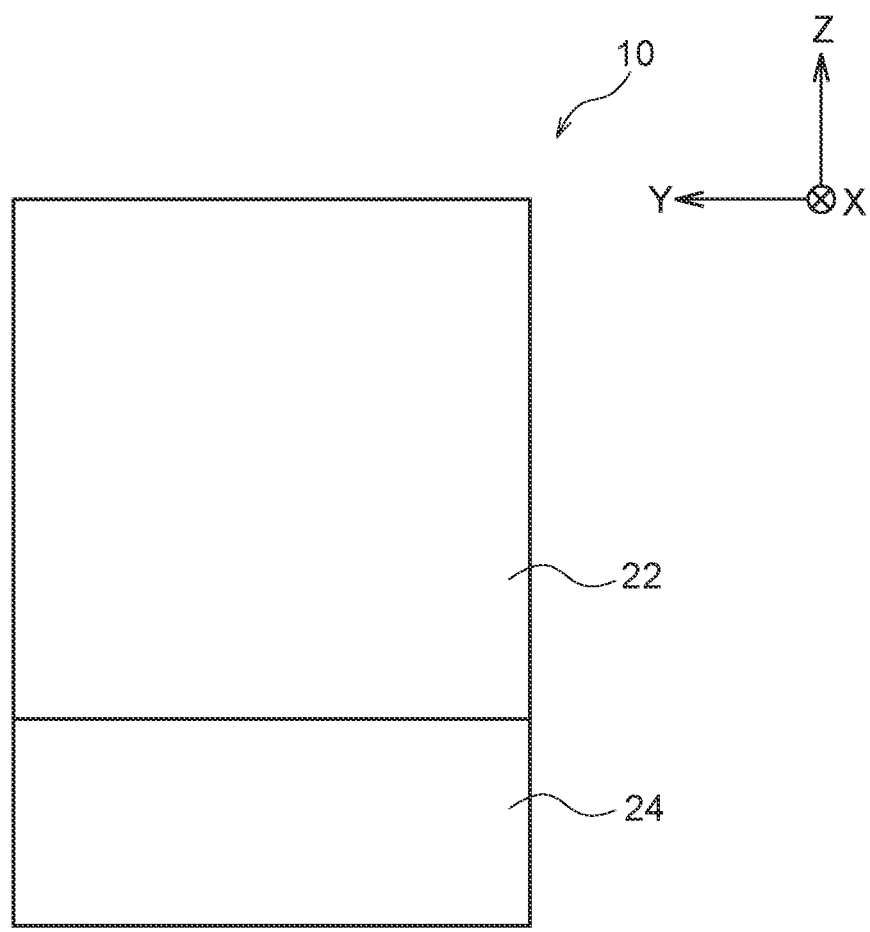
FIG. 4 is a schematic top view of a cutting machine of the first exemplary embodiment, as viewed along the X direction of FIG. 1.
Figure 5:
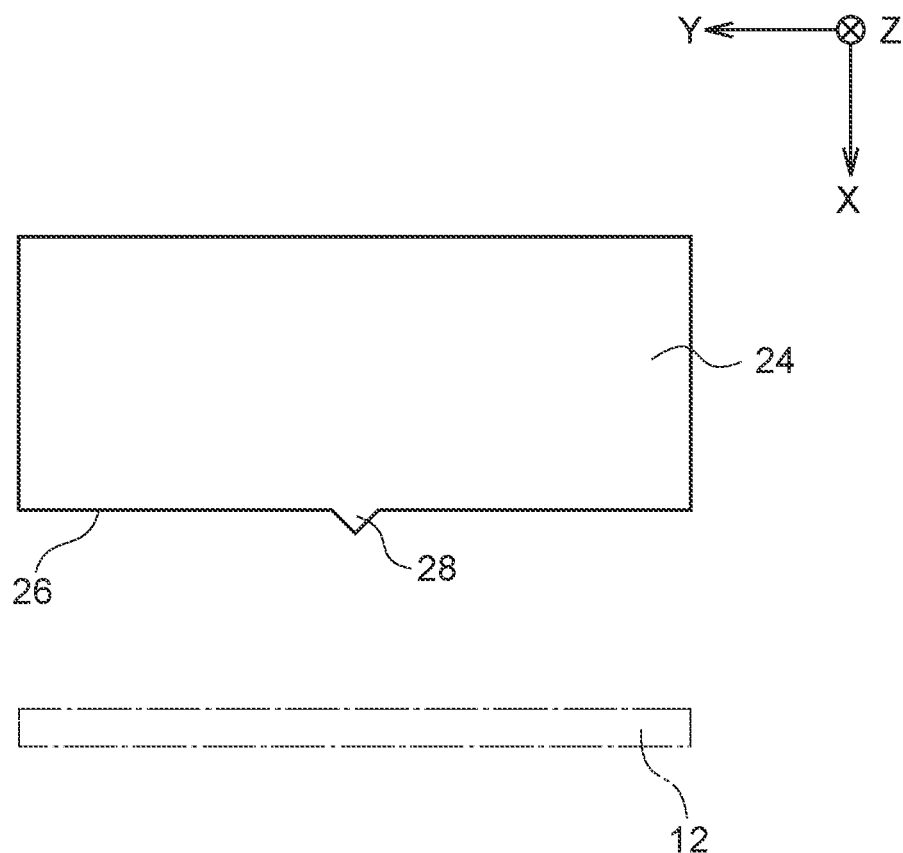
FIG. 5 is a schematic front view illustrating a punch of the first exemplary embodiment, as viewed along the Z direction of FIG. 1.

FIG. 1 illustrates a cutting machine 10 for executing a cutting method using a stamping press according to the present exemplary embodiment. FIG. 2 is a front face view of the cutting machine 10 illustrated in FIG. 1. FIG. 3 illustrates a side face of the cutting machine 10 illustrated in FIG. 1. Moreover, FIG. 4 illustrates an upper face of the cutting machine 10 illustrated in FIG. 1. FIG. 5 illustrates a front face of a punch 24. In each of the drawings, an X axis, a Y axis, and a Z axis illustrate three mutually orthogonal axes.

The cutting machine 10, for example as illustrated in FIG. 1 to FIG. 5, is a device for cutting a sheet shaped workpiece 12 by shearing with the punch 24 and a die 20. Note that for ease of explanation, details concerning a configuration of the cutting machine 10 will be described later. The workpiece 12 to be cut is, for example as illustrated in FIG. 2, a metal sheet configured from a first metal sheet 14 and a second metal sheet 16 that have been formed into a sheet shape by rolling, and have been joined by welding together abutting portions thereof. A weld portion 18 is formed at a portion between the first metal sheet 14 and the second metal sheet 16, this being the abutting portion. Heat-affected zones 30, 32 are formed around the weld portion 18 (at both sides of the weld portion 18 in the Y direction). For ease of explanation, details concerning a configuration of the weld portion 18, and of the heat-affected zones 30, 32 will be described later.

Fusion welding, such as arc welding or the like, pressure welding, such as resistance welding including upset welding and flash welding, may, for example, be employed to weld the abutting portions together.

In the workpiece 12, there is no limitation to welding the abutting portions and, for example, the workpiece 12 may be a metal plate configured from the first metal sheet 14 and the second metal sheet 16 joined by various joining methods, such as mash seam welding, friction stir welding, and the like.

Moreover, irrespectively to the welding method, the first metal sheet 14 and the second metal sheet 16 may be metal sheets of the same type of metal or metal sheets of different types of metal. Tailor welded blanks (TWBs) of different types of metal sheet joined by welding are press stock tailored as desired for strength, rust-proofing, and the like.

Stock for the workpiece 12 is not limited to steel sheet, and examples include iron, copper, zinc, tin, aluminum, titanium, magnesium, and alloys based thereon. There thickness dimension T12 of the workpiece 12 is not limited to a particular thickness, so long as it is a thickness capable of being sheared. Moreover, the thicknesses of the first metal sheet 14 and the second metal sheet 16 may be different from each other.

Note that in cold shearing, the thickness dimension T12 of the workpiece 12 preferably does not exceed 6.0 mm from the perspective of preserving product dimensional precision. In particular, the thickness dimension T12 of the workpiece 12 preferably does not exceed 3.0 mm in cases in which a high degree of product dimensional precision is demanded.

However, when the thickness dimension T12 of the workpiece 12 is too thin, then joining by welding becomes unstable, and so the thickness dimension T12 of the workpiece 12 is preferably 0.1 mm or greater. Moreover, the thickness dimension T12 is more preferably 0.5 mm or greater.

The workpiece 12 is, for example, employed in automobiles, consumer electricals, construction structures, ships, bridges, construction machinery, various plant, or the like.

Moreover, examples serving as the workpiece 12 include cold rolled sheets and the like that, after shearing in blanking or piercing using a press, sheared portions thereof are subjected to hole widening or to flange raising.

Figure 6:
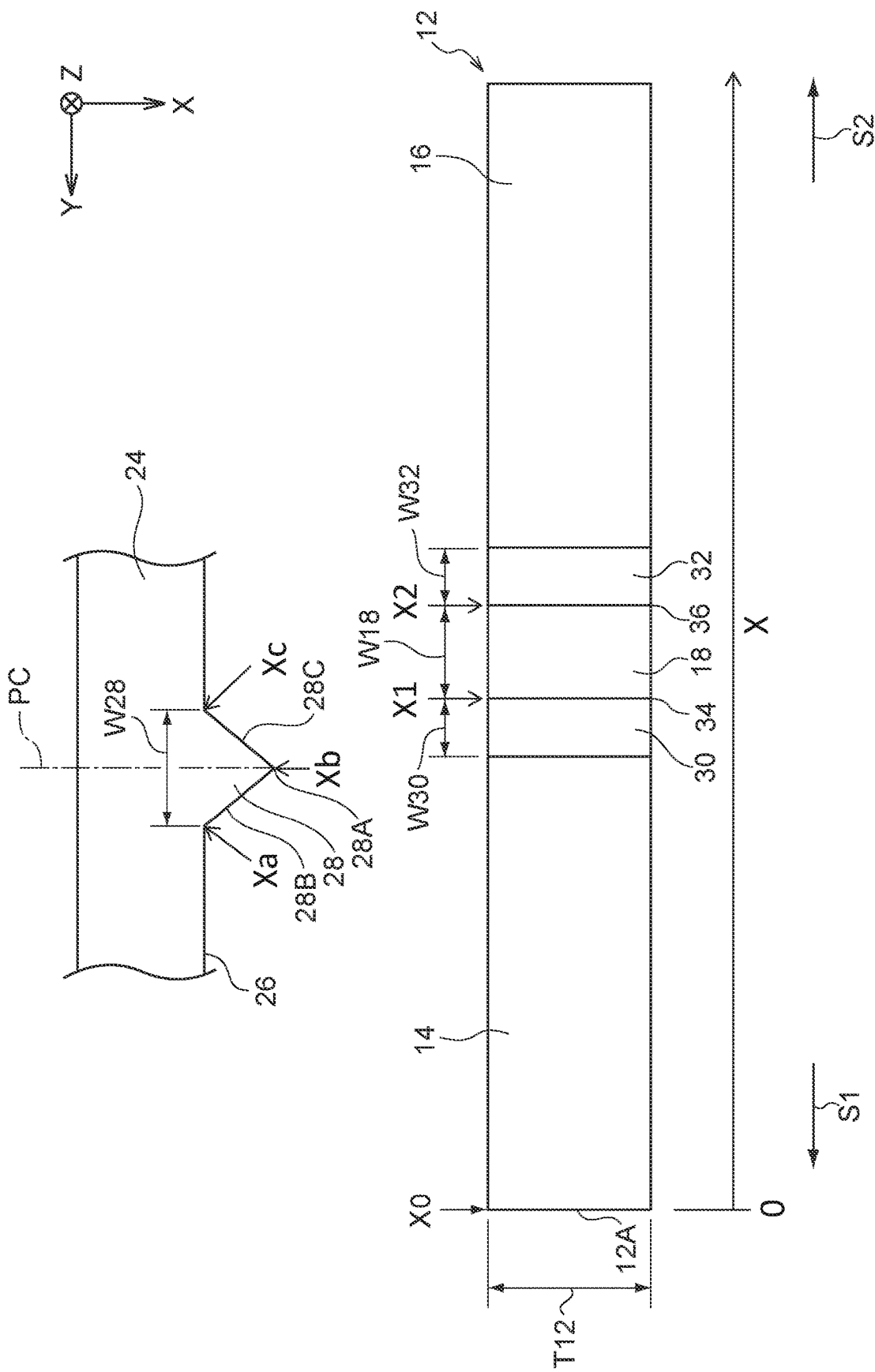
FIG. 6 is an enlarged diagram of FIG. 5 to explain a relationship between a projecting portion of the punch according to the first exemplary embodiment and a workpiece.

As illustrated in FIG. 6, the weld portion 18 and the heat-affected zones 30, 32 described above are formed in the workpiece 12. The weld portion 18 is a portion where the first metal sheet 14 and the second metal sheet 16 that have melted have then re-solidified. The heat-affected zones 30, 32 are structures in the workpiece 12 that have not been melted by heat applied when forming the weld portion 18, but where changes have occurred in metal (metallurgical) properties, mechanical properties, or the like (see, for example, the JIS standard on welding terminology (JIS Z 3001 no. 11202)).

For ease of explanation, in the present exemplary embodiment, the heat-affected zone of the first metal sheet 14 on an S1 side of the weld portion 18 is referred to as a first heat-affected zone 30, and the heat-affected zone of the second metal sheet 16 on the other S2 side thereof is referred to as a second heat-affected zone 32.

Let the coordinate in the Y axis direction of an edge 12A at the S1 side of the workpiece 12 be X0, and a distance from X0 to a first boundary 34 between the first heat-affected zone 30 and the weld portion 18 be X1. Moreover, let a distance from X0 to a second boundary 36 between the second heat-affected zone 32 and the weld portion 18 be X2.

Next, description follows regarding a detailed configuration of the cutting machine 10. The cutting machine 10 includes, for example as illustrated in FIG. 1 to FIG. 4, a die 20 having a cuboidal shape. The workpiece 12 is placed on an upper face of the die 20. A stopper 22 is disposed above the die 20. The stopper 22 is also formed in a cuboidal shape substantially similar to that of the die 20. The stopper 22 is disposed such that a front face 22A, which is the face on the Z axis direction side, is positioned in the Z axis direction in the same flat plane as a front face 20A of the die 20. The stopper 22 is raised or lower by, for example, a raising and lowering mechanism, not illustrated in the drawings, and fixed so as to press the workpiece 12, which has been set on the upper face of the die 20, from above.

The punch 24 is provided on the front face 22A side of the stopper 22. The punch 24 is formed in a cuboidal shape, and is set with a width dimension in the Y axis direction that is substantially the same dimension as the width dimension of the stopper 22 and the die 20. The punch 24 is driven by a drive mechanism, not illustrated in the drawings, in the up-down direction, which is the X axis direction, along the front face 22A of the stopper 22 and the front face 20A of the die 20. Thus, in a state in which the workpiece 12 is clamped between the die 20 and the stopper 22, the punch 24 is thereby configured so as to be able to cut an extending portion of the workpiece 12 extending out from the die 20 by a shearing action of the punch 24 and the die 20.

Figure 7:
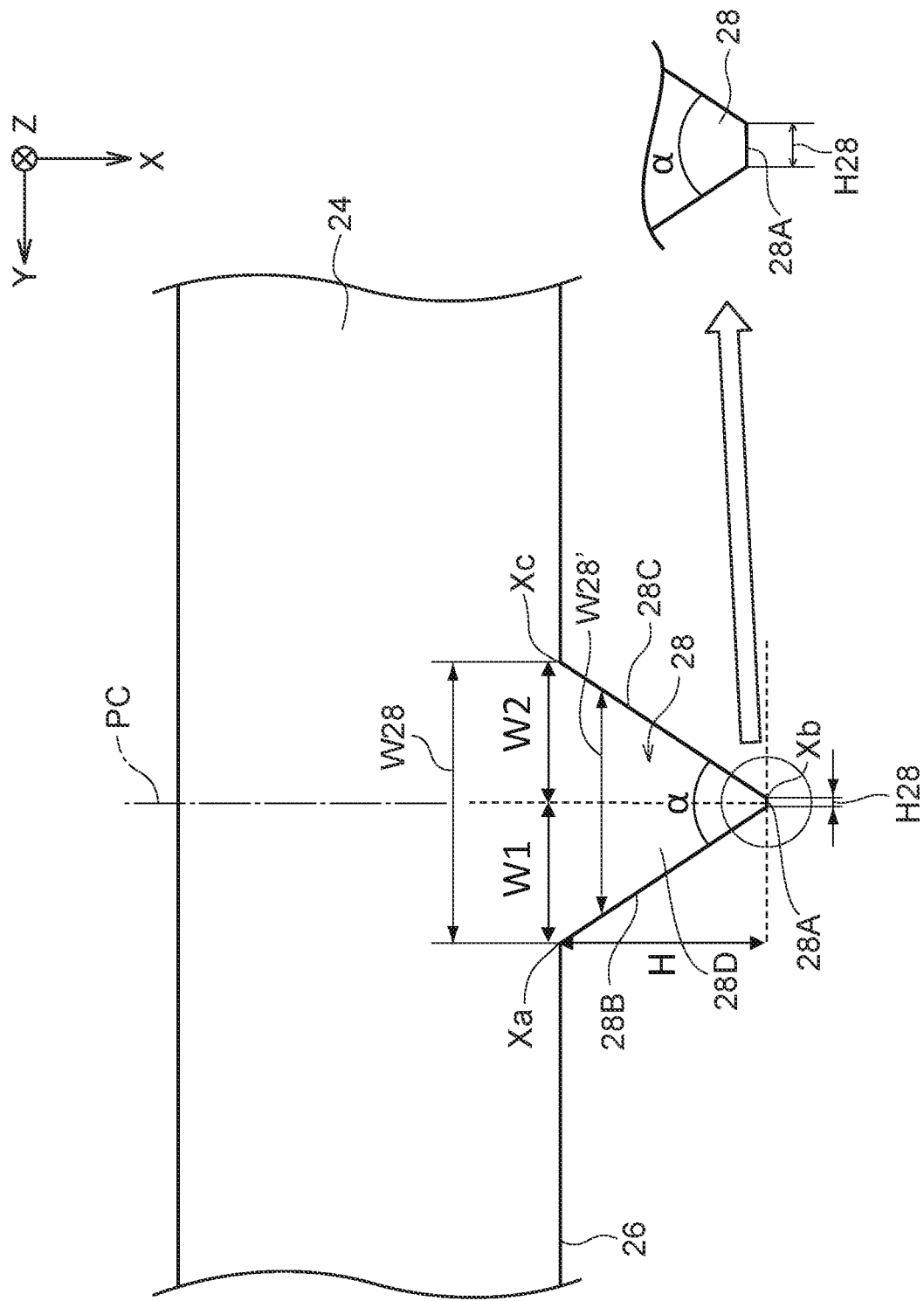
FIG. 7 is an enlarged diagram of FIG. 6 to explain a projecting portion according to the first exemplary embodiment.

The X axis direction lower face of the punch 24 is formed flat, as illustrated in FIG. 5. This flat lower face is a flat portion 26. A projecting portion 28 is formed at a center of the flat portion 26 in the width direction, which is the Y axis direction (illustrated by the punch center line PC in FIG. 7 in the present exemplary embodiment), with the projecting portion 28 projecting toward the workpiece 12 side. The workpiece 12 is, for example as illustrated in FIG. 7 and FIG. 8, set on the die 20 as described below, so as to be disposed below the flat portion 26 in the X axis direction. As illustrated in FIG. 8, the projecting portion 28 forms a projection that extends in the front-rear direction, which is the Z axis direction. Note that the punch 24 may be provided with plural of the projecting portions 28.

The projecting portion 28 is, for example as illustrated in FIG. 7, formed in a wedge shape such that a width dimension W28' in the Y axis direction narrows on progression in the projecting direction, which is downward in the X axis direction, from base ends Xa, Xc on the flat portion 26 side, which is the X axis direction upper side. Namely, when sectioned orthogonally to the movement direction of the punch 24 (the X axis direction), the projecting portion 28 has a cross-sectional area that decreases on progression from a base end portion on the flat portion 26 side toward a cutting edge 28A at the leading end of the projecting portion 28.

This reference to a wedge shape means a blade having one end that is thick and that thins on progression toward the other end. In the present exemplary embodiment, the cutting edge of the blade may be pointed or may be flat.

The projecting portion 28 that is formed in the wedge shape includes one face 28B formed on a face on one Y axis direction side, and another face 28C formed on a face on the other side. The one face 28B and the other face 28C are configured by flat faces that are inclined toward the punch center line PC side on progression from the flat portion 26 toward a tip Xb side. The "punch center line PC" referred to here is an imaginary line that extends along the X axis direction so as to pass through a center of the punch 24 in the Y axis direction. Moreover, the "tip Xb" is a location at the Y axis direction center of the cutting edge 28A, and is positioned on the punch center line PC. The one face 28B and the other face 28C are linked by the flat cutting edge 28A on the tip Xb side of the projecting portion 28.

A front end face 28D of the projecting portion 28 is, for example as illustrated in FIG. 8, formed so as to be contiguous downward in the X axis direction from a front face 24A of the punch 24. The front end face 28D has an isosceles triangle shape (see FIG. 7) projecting downward in the X axis direction as viewed along the Z axis direction. Moreover, similarly, a rear end face 28E of the projecting portion 28 is also formed so as to contiguous to a rear face 24B of the punch 24. Moreover, the shape is an equilateral triangular shape projecting downward in the X axis direction as viewed along the Z axis direction.

It is sufficient that the projecting portion 28 projects from the flat portion 26 at least downward in the X axis direction. Due to adopting such a configuration, the projecting portion 28 starts to cut the workpiece 12 before the flat portion 26 cuts the workpiece 12, as described below. The present invention is able to obtain the advantageous effect of reducing residual stress at the sheared faces by adopting such a configuration.

Moreover, in order to obtain the advantageous effect of reducing residual stress at the sheared faces, for example as illustrated in FIG. 7, a projection dimension H of the projecting portion 28 from the flat portion 26 is preferably not less than 10% of the thickness dimension T12 of the workpiece 12 to be cut (see FIG. 6). Furthermore, the projection dimension H is more preferably not less than 50% of the thickness dimension T12 of the workpiece 12.

Note that although a greater advantageous effect of reducing residual stress at the sheared faces is obtained the larger the projection dimension H referred to here, an upper limit for the projection dimension H is naturally limited so as to avoid impinging on the set workpiece 12 when the punch 24 is in an upper position.

Moreover, preferably the following parameters are satisfied in order to prevent damage to the cutting edge 28A. Namely, an angle α formed between the one face 28B and the other face 28C of the projecting portion 28 is preferably 10 degrees or greater. This is because there is a concern regarding stress concentrating at the cutting edge 28A and damage to the cutting edge 28A occurring if the angle α is less than 10 degrees.

Moreover, the angle α is preferably not greater than 170 degrees from the perspective of being able to concentrate the shear stress, and is more preferably not greater than 120 degrees. Moreover, the angle α is even more preferably not greater than 80 degrees.

A positional relationship between the workpiece 12 and the projecting portion 28, and a width dimension W28 between the base end Xa and the base end Xc on the flat portion 26 side of the projecting portion 28 is determined as indicated below.

When the tip Xb abuts and shears the Y axis direction center of the weld portion 18, the following parameters for the positional relationship between the workpiece 12 and the projecting portion 28 enable the advantageous effect of reducing residual stress at the sheared faces to be obtained for the weld portion 18 and the heat affected zones 30, 32.

The width dimension W28 is determined based on the width dimension W18 of the weld portion 18. First, as illustrated in FIG. 7, let the base end Xa at the intersection of the one face 28B of the projecting portion 28 and the flat portion 26 be a first base end Xa, and let the base end Xc at the intersection of the other face 28C of the projecting portion 28 and the flat portion 26 be a second base end Xc. Moreover, let the distance from the first base end Xa to the punch center line PC be a first width dimension W1, and let the distance from the second base end Xc to the punch center line PC be a second width dimension W2. Let the total width dimension of the first width dimension W1 and the second width dimension W2 be the width dimension W28. In the present exemplary embodiment, the width dimension W28 is larger than the width dimension W18 of the weld portion 18, for example as illustrated in FIG. 6 (W28=(W1+W2)>W18).

In order to maintain end face properties of shear faces other than at the weld portion 18 and to obtain the advantageous effect of reducing residual stress at the sheared faces, preferably setting is performed within a range such that α<170 degrees and W28=(W1+W2)<5×T12 (the thickness dimension T12 of the workpiece 12). More preferably, the width dimension W28 at the base end portion of the projecting portion 28 is set within a range such that α<120 degrees and W28=(W1+W2)<5×T12 (the thickness dimension T12 of the workpiece 12).

The wedge shaped cutting edge 28A is, for example as illustrated in FIG. 7, formed flat. Such a cutting edge 28A has a rectangular shaped face as viewed along the X axis direction from the lower side. If the tip portion of the cutting edge 28A is an acute angle then there is a concern regarding damage from chipping occurring due to stress concentrating at the cutting edge 28A. Thus the cutting edge 28A is made flat, enabling damage to the cutting edge 28A to be prevented and the punch 24 to be protected.

The width dimension H28 of the cutting edge 28A in the Y axis direction is preferably not less than 1% of the thickness dimension T12 of the workpiece 12 (see FIG. 6). Making the width dimension H28 not less than 1% of the thickness dimension T12 prevents excessive stress concentration at the cutting edge 28A. This thereby enables damage to the cutting edge 28A to be prevented. Moreover, the width dimension W28 at the base end portion of the projecting portion 28 is preferably smaller than the total width of the width dimension W18, the width dimension W30, and the width dimension W32. Making the width dimension W28 such a value means that the projecting portion 28 does not overlap with the entire region of the weld portion 18 and the heat affected zones 30, 32 in the width direction when the projecting portion 28 shears the workpiece 12. This enables the advantageous effect of reducing residual stress at the shear faces to be reliably obtained at least in one region of the weld portion 18 and the heat affected zones 30, 32.

Moreover, the shape of the cutting edge 28A of the projecting portion 28 may be a curved shape (rounded shape) as described below with reference to FIG. 15 and FIG. 16. Making the cutting edge 28A a curved shape prevents a concentration of stress, enabling damage to the cutting edge 28A to be prevented.

A clearance 38, for example as illustrated in FIG. 8, where a gap is formed between the rear face 24B of the punch 24 and the front face 20A of the die 20 is preferably a dimension from 0.5% to 25% of the thickness dimension T12 of the workpiece 12 as expressed in the following.

If the clearance 38 is less than 0.5% of the thickness dimension T12 of the workpiece 12 then there is a concern regarding damage to the tip portion of the projecting portion 28 due to chipping occurring, and so the clearance 38 is preferably not less than 0.5% of the thickness dimension T12 of the workpiece 12. The clearance 38 is more preferably not less than 1.0% thereof.

However, if the clearance 38 exceeds 25% of the thickness dimension T12 of the workpiece 12, then curving of the workpiece 12 increases, with burr liable to be generated. The clearance 38 is accordingly 25% of the thickness dimension T12 of the workpiece 12 or less. The clearance 38 is more preferably 15% thereof or less.

When using the cutting machine 10 to execute the cutting method using a stamping press of the present exemplary embodiment, the workpiece 12 is set on an upper face 20B of the die 20, the workpiece 12 is slid in the Z axis direction such that a portion to be sheared off juts out from the die 20, with a shear position aligned with a front edge 20C of the die 20 (setting process).

Figure 9A:
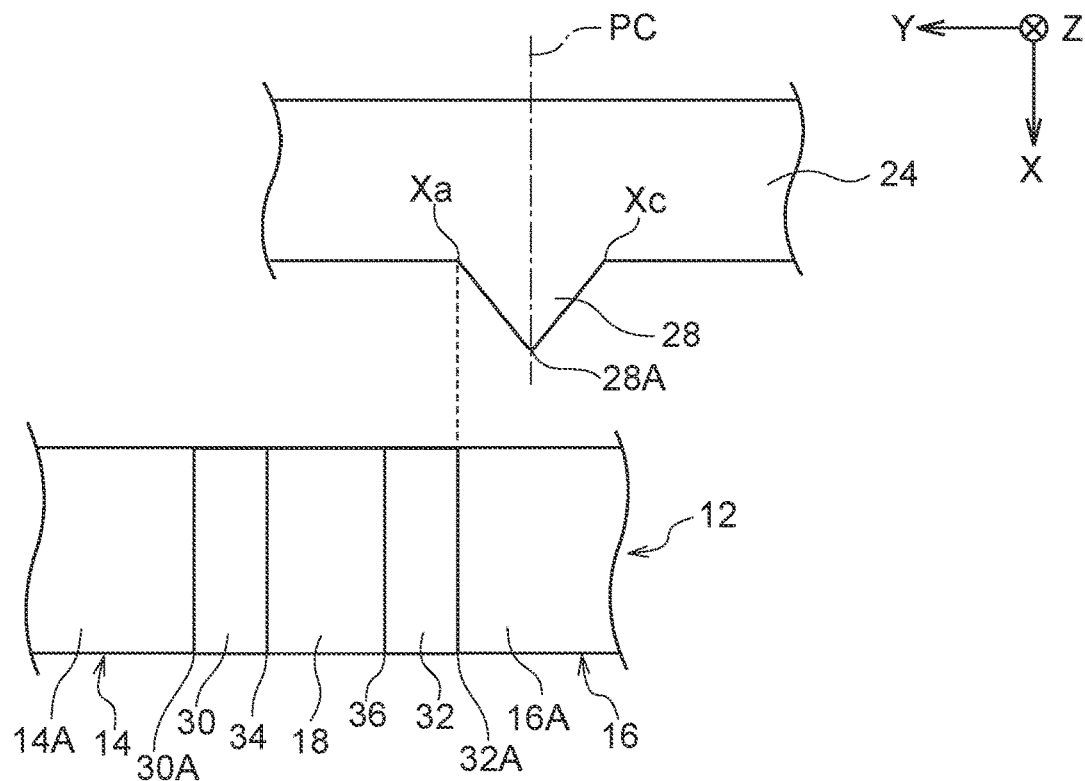
FIG. 9A is a diagram similar to FIG. 6, and is used to explain when positioning of a workpiece is at a second metal sheet side with respect to a punch.

When this is performed, first, as illustrated in FIG. 9A, the workpiece 12 is positioned with respect to the punch 24 such that the first base end Xa of the projecting portion 28 is positioned further to the first metal sheet 14 side than a boundary 32A between the second heat-affected zone 32 of the second metal sheet 16 and a general portion 16A thereof. Reference in the present exemplary embodiment to a "general portion" indicates a portion of the workpiece 12 that is not affected by welding, namely a portion on the Y axis direction outside of the heat-affected zones. Thereby, the projecting portion 28 start to cut the workpiece 12 at least at one out of the weld portion 18 or at least one of the heat affected zones 30, 32 before the flat portion 26 of the punch 24 cuts the workpiece 12. Note that reference in the present exemplary embodiment to "starting cutting" means contact between the punch 24 and the workpiece 12 (generation of die roll).

Figure 9B:
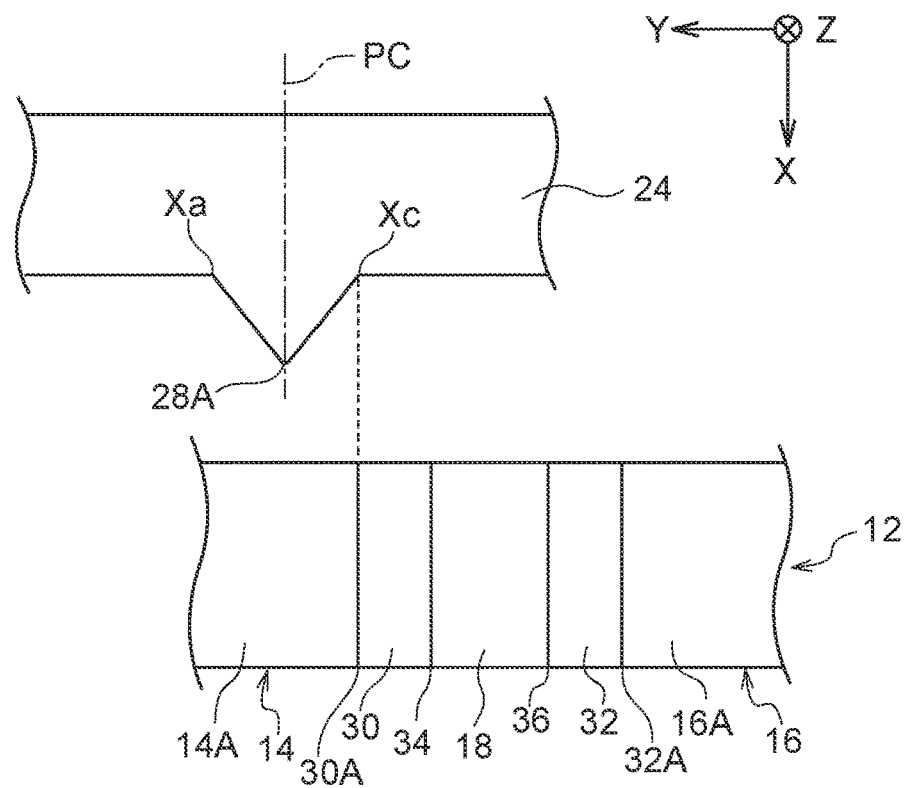
FIG. 9B is a diagram similar to FIG. 6, and is used to explain when positioning of a workpiece is at a first metal sheet side with respect to a punch.

Similarly, as illustrated in FIG. 9B, the workpiece 12 is positioned with respect to the punch 24 such that a second base end Xc of the punch 24 is positioned further to the second metal sheet 16 side than a boundary 30A between the first heat-affected zone 30 and a general portion 14A. Namely, it is sufficient to position the workpiece 12 with respect to the punch 24 such that one out of the first base end Xa or the second base end Xc is positioned inside a range from the boundary 30A to the boundary 32A of the workpiece 12.

It is known that in cases in which plural of the workpieces 12 are formed by welding the metal sheets 14,16, which have the same combination of materials as each other, under the same respective conditions, the width dimensions of the weld portion 18 and the heat affected zones 30, 32 are substantially the same dimension in the respective workpieces 12.

Thus, the position in the Y axis direction and the width dimension of the weld portion 18 and the heat affected zones 30, 32 may be measured in advance for a representative sample of the workpieces 12 to be cut. The results of such measurement may then be employed to position the Y axis direction of the workpiece 12 with respect to the projecting portion 28 of the punch 24.

In such a positioned state, the drive mechanism is operated to lower the punch 24 and to move the punch 24 relative to the die 20. The workpiece 12 is then cut by shearing so as to cut the workpiece 12 across the weld portion 18 (cutting process). Note that the die 20 may be moved with respect to the punch 24.

In this cutting process, the cutting edge 28A of the projecting portion 28 contacts the workpiece 12 fixed by the die 20 and the stopper 22. When this occurs, by positioning the workpiece 12 in advance such that one out of the first base end Xa or the second base end Xc is positioned between the boundary 30A and the boundary 32A of the workpiece 12, the projecting portion 28 is inserted at least at one location of the heat affected zones 30, 32 and the weld portion 18 when the punch 24 is lowered. The projecting portion 28 then shears the workpiece 12 as stress acts on the at least one location of the heat affected zones 30, 32 and the weld portion 18. When this occurs, due to stress concentrating at the cutting edge 28A of the projecting portion 28, the cutting edge 28A is inserted into the workpiece 12 while pressing downward on the workpiece 12 in the X axis direction. Although the region of the workpiece 12 in contact with the projecting portion 28 is sheared by the stress acting downward in the X axis direction through the projecting portion 28, the stress acting in the vicinity of the shearing location is limited and there is only a small amount of plastic deformation. The regions of the workpiece 12 sheared by the projecting portion 28 are thereby progressively sheared in a state restrained by the workpiece 12 at the periphery thereof. Thus, the generation of ductile fracture cracks is delayed in the regions in contact with the projecting portion 28, extending the shear face region, and reducing residual tensile stress. In this manner, the projecting portion 28 shears the workpiece 12 before the flat portion 26 of the punch 24 cuts the workpiece 12.

Then, as the punch 24 is lowered, the flat portion 26 abuts the workpiece 12 and presses the workpiece 12. Thereby, the workpiece 12 curves by deforming downward under the stress generated by the pressing, and the workpiece 12 receives a shearing action from the flat portion 26 of the punch 24 and the die 20 while being in a curved state, and is cut.

When this occurs, a portion of the workpiece 12 is sheared by the projecting portion 28 before the flat portion 26 cuts the workpiece 12 as a whole, extending the shear face region. Thus, in comparison to cases in which the workpiece 12 is cut by the flat portion 26 of the punch 24 alone, the tensile stress remaining in at least one location of the heat affected zones 30, 32 and the weld portion 18 during the shearing can be greatly reduced. As a result, the generation of hydrogen embrittlement cracking and the generation of fatigue cracks at the sheared faces after shearing can be suppressed.

Thus, for example, even for high strength steel sheets with a tensile stress exceeding 1000 MPa where there is liable to be high residual stress at the sheared faces, and in tailor welded blanks (TWBs), the generation of hydrogen embrittlement cracking and the generation of fatigue cracks can be suppressed.

Moreover, for example, even in cases in which there is a somewhat large clearance 38 between the punch 24 and the die 20, such as, for example, 10% or greater, sheared faces can be formed that have excellent tensile properties, fatigue properties, and hydrogen embrittlement resistance.

The width dimension W28 at the base end of the projecting portion 28 is set larger than the width dimension W18 of the weld portion 18. Thus, for example as illustrated in FIG. 10, the projecting portion 28 can cut the weld portion 18 and at least a portion of the first heat-affected zone 30 adjacent to the weld portion 18 and at least a portion of the second heat-affected zone 32 adjacent to the weld portion 18 before the flat portion 26 cuts the workpiece 12. This enables tensile stress remaining at the sheared faces in the weld portion 18, the first heat-affected zone 30, and the second heat-affected zone 32 to be reduced, enabling the generation of hydrogen embrittlement cracking and the generation of fatigue cracks to be effectively suppressed.

Note that the residual stress at sheared faces can be reduced so long as the projecting portion 28 cuts at least a portion of the weld portion 18, or the first heat-affected zone 30, or the second heat-affected zone 32 before cutting by the flat portion 26, enabling the generation of hydrogen embrittlement cracking and the generation of fatigue cracks to be suppressed.

For example, as illustrated in FIG. 11, certainty that the weld portion 18 and the second heat-affected zone 32 are sheared first is achieved by positioning the workpiece 12 such that the center of the cutting edge 28A of the projecting portion 28 is aligned with the second boundary 36 between the weld portion 18 and the second heat-affected zone 32. The residual stress at sheared faces is accordingly reduced, enabling the generation of fatigue cracks at the second boundary 36 to be suppressed.

Moreover, for example as illustrated in FIG. 12, by the projecting portion 28 of the punch 24 shearing a portion of, for example, the second heat-affected zone 32 before cutting by the flat portion 26, the residual stress is reduced at the sheared faces of the second heat-affected zone 32, enabling the generation of fatigue cracks to be suppressed.

The projection dimension H of the projecting portion 28 from the flat portion 26 is set to not less than 50% of the thickness dimension T12 of the workpiece 12 to be cut. The shearing effect of the projecting portion 28 is thereby raised.

Note that in the present exemplary embodiment, and in a second exemplary embodiment to an eighth exemplary embodiment explained below, although the projection dimension H is set to not less than 50% of the thickness dimension T12, some residual stress reduction effect is still obtained at the sheared faces due to the projecting portion 28 so long as the projection dimension H is not less than 10% of the thickness dimension T12.

Moreover, the angle α formed between the one face 28B and the other face 28C of the projecting portion 28 is set to not less than 10 degrees, so as to prevent damaging the cutting edge 28A. Moreover, the angle α is set to from 10 degrees to 80 degrees. This enables the width dimension W28 to be secured at the base end of the projecting portion 28 while suppressing damage to the cutting edge 28A.

Note that in the present exemplary embodiment, and in a second exemplary embodiment to an eighth exemplary embodiment explained below, although the angle α is set from 10 degrees to 80 degrees, there is no limitation thereto. For example, the upper limit to the angle α may be set to not greater than 120 degrees, or to not greater than 170 degrees.

Moreover, in the present exemplary embodiment, and in a second exemplary embodiment to an eighth exemplary embodiment explained below, although the projecting portion 28 is configured with a wedge shape so as to facilitate insertion of the cutting edge 28A into the workpiece 12, there is no limitation to such a shape. Some residual stress reduction effect can still be obtained at the sheared faces even if the projecting portion 28 is configured, for example, in a rectangular shape.

Second Exemplary Embodiment

FIG. 13 is a diagram illustrating a second exemplary embodiment of the present disclosure. Portions that are the same or equivalent to those of the first exemplary embodiment are appended with the same reference signs and description thereof is omitted. Only portions that differ from those of the first exemplary embodiment are described.

Namely, in the present exemplary embodiment, the shape of a projecting portion 28 differs from that of the first exemplary embodiment. In the projecting portion 28 according to the present exemplary embodiment, a first width dimension W1, from a first base end Xa at the intersection between one face 28B and a flat portion 26 to a punch center line PC, is set shorter than a second width dimension W2, from the punch center line PC to a second base end Xc at the intersection between another face 28C and the flat portion 26 (W1<W2).

In such cases, the position where suppression of hydrogen embrittlement cracking is desired (a position where hydrogen embrittlement cracking is anticipated to be the most extreme) is preferably disposed, sheared, and cut at the center of a cutting edge 28A of the projecting portion 28.

This enables similar advantageous effects to be obtained to those of the first exemplary embodiment even in cases in which the first width dimension W1 and the second width dimension W2 differ from each other.

Third Exemplary Embodiment

FIG. 14 is a diagram illustrating a third exemplary embodiment of the present disclosure. Portions that are the same or equivalent to those of the first exemplary embodiment are appended with the same reference signs and description thereof is omitted. Only portions that differ from those of the first exemplary embodiment are described.

Namely, in the present exemplary embodiment, the shape of a projecting portion 28 differs from that of the first exemplary embodiment. The projecting portion 28 according to the present exemplary embodiment is configured with curved faces in which one face 28B and another face 28C are recessed inward, and an acute cutting edge 28A is formed.

The present exemplary embodiment also enables similar advantageous effects to be obtained to those of the first exemplary embodiment. Moreover, with the projecting portion 28, although residual stress is reduced at positions in the vicinity of the tip of the cutting edge 28A and the generation of hydrogen embrittlement cracking and the generation of fatigue cracks can be effectively suppressed, there is a large deterioration in effectiveness at positions way from the tip.

Fourth Exemplary Embodiment

Figure 15:
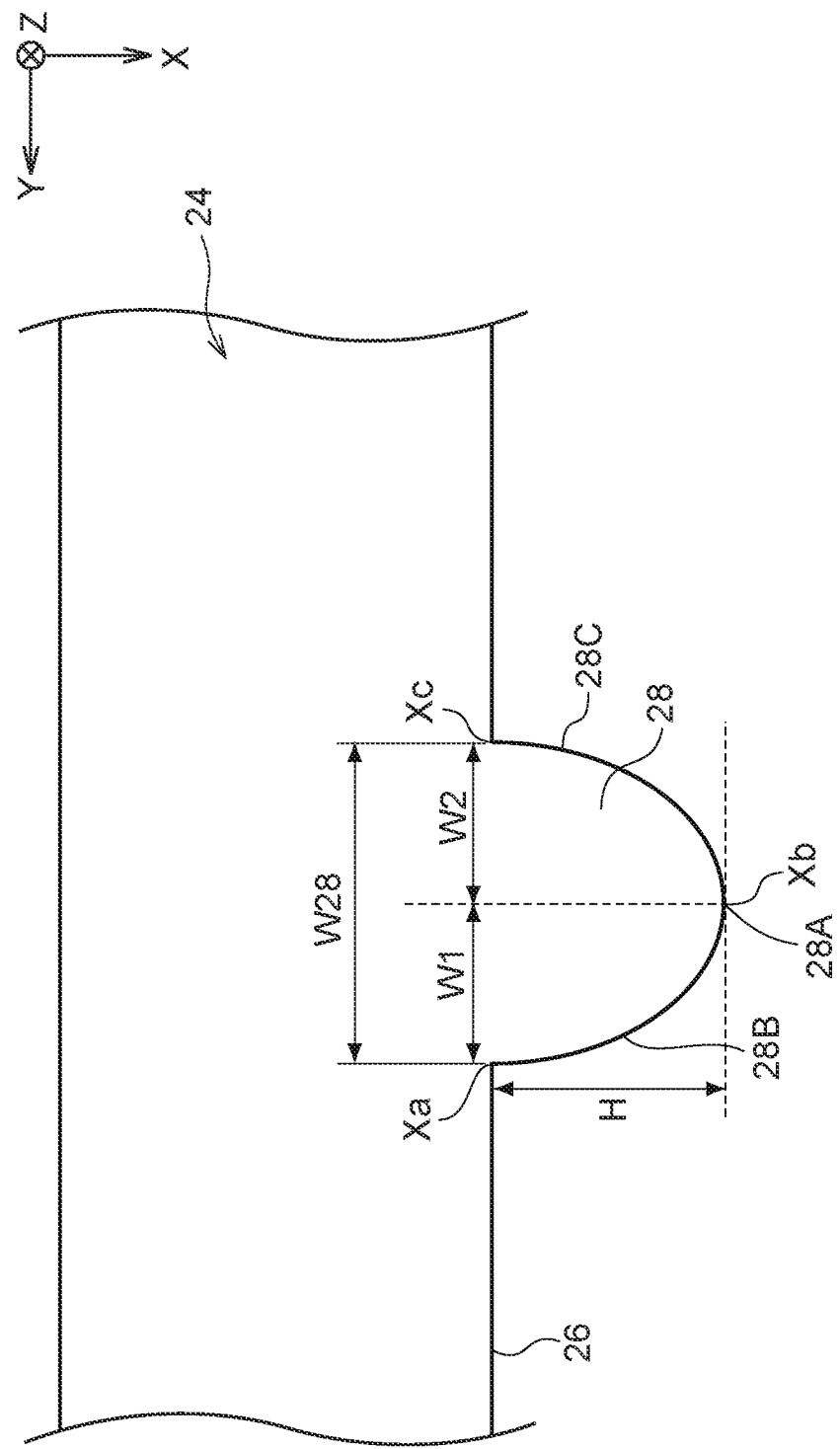
FIG. 15 is a schematic front view to explain a shape of a projecting portion according to a fourth exemplary embodiment.

FIG. 15 is a diagram illustrating a fourth exemplary embodiment of the present disclosure. Portions that are the same or equivalent to those of the first exemplary embodiment are appended with the same reference signs and description thereof is omitted. Only portions that differ from those of the first exemplary embodiment are described.

Namely, in the present exemplary embodiment, the shape of the projecting portion 28 is different from that of the first exemplary embodiment. The projecting portion 28 according to the present exemplary embodiment is configured by curved faces in which one face 28B and another face 28C bulge outward, and a cutting edge 28A at the tip of the projecting portion 28 is configured by a curved face.

The present exemplary embodiment also enables similar advantageous effects to be obtained to those of the first exemplary embodiment.

Moreover, an effect to prevent damage at the cutting edge 28A can be enhanced. Furthermore, a more uniform residual tensile stress reduction effect is obtained within the range of the width dimension W28 (W28=W1+W2) at the base end of the projecting portion 28.

Fifth Exemplary Embodiment

Figure 16:
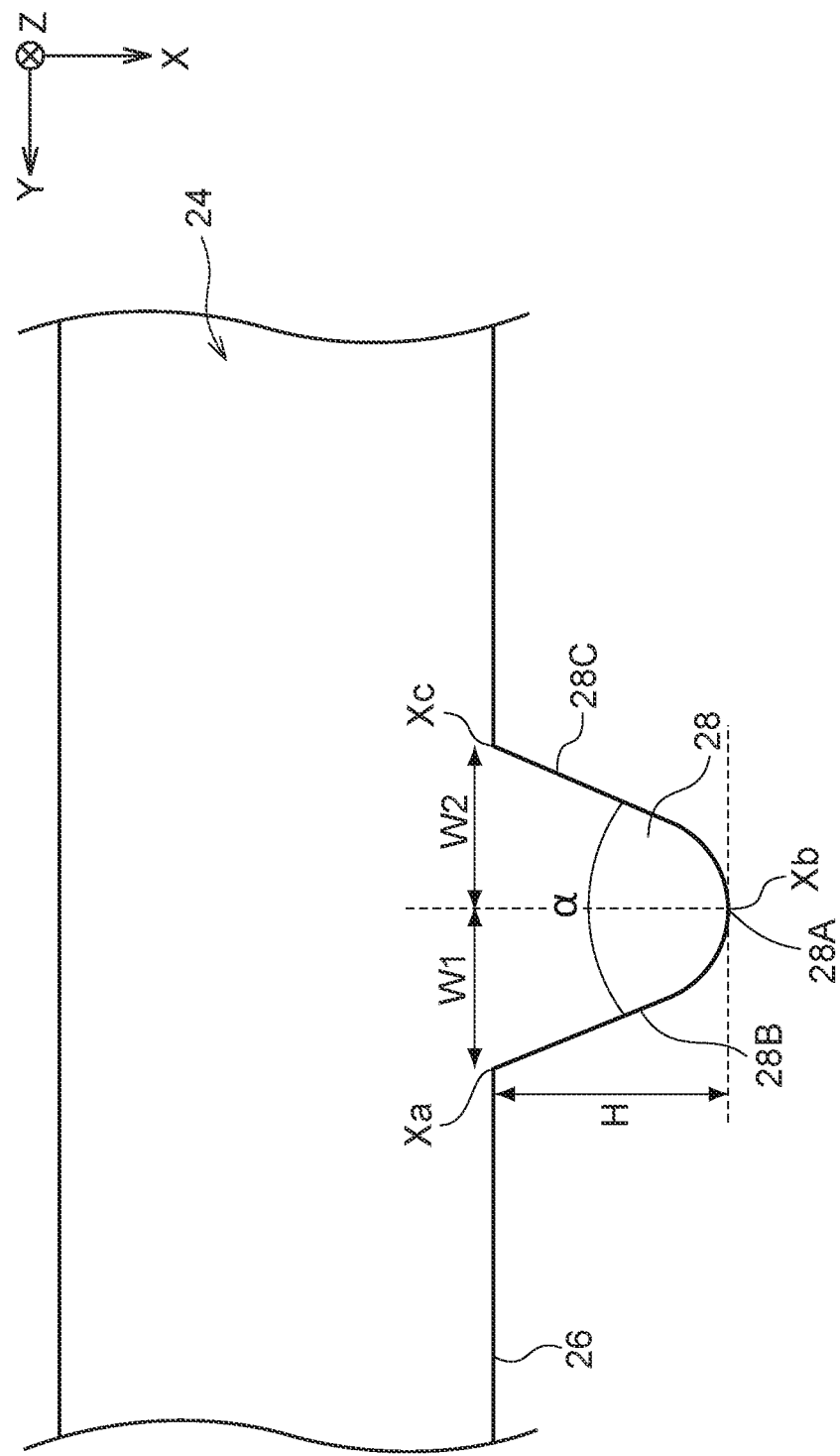
FIG. 16 is a schematic front view to explain a shape of a projecting portion according to a fifth exemplary embodiment.

FIG. 16 is a diagram illustrating a fifth exemplary embodiment of the present disclosure. Portions that are the same or equivalent to those of the first exemplary embodiment are appended with the same reference signs and description thereof is omitted. Only portions that differ from those of the first exemplary embodiment are described.

Namely, in the present exemplary embodiment, the shape of the projecting portion 28 is different from that of the first exemplary embodiment. The projecting portion 28 according to the present exemplary embodiment has a cutting edge 28A at the tip configured by a curved face that projects toward the tip side and is rounded.

The present exemplary embodiment also enables similar advantageous effects to be obtained to those of the first exemplary embodiment.

Moreover, the greater the radius of curvature (R) of the cutting edge 28A, the more that damage to the cutting edge 28A can be reduced. However, the smaller the radius of curvature (R), the greater the residual tensile stress reduction effect obtained.

Sixth Exemplary Embodiment

Figure 17:
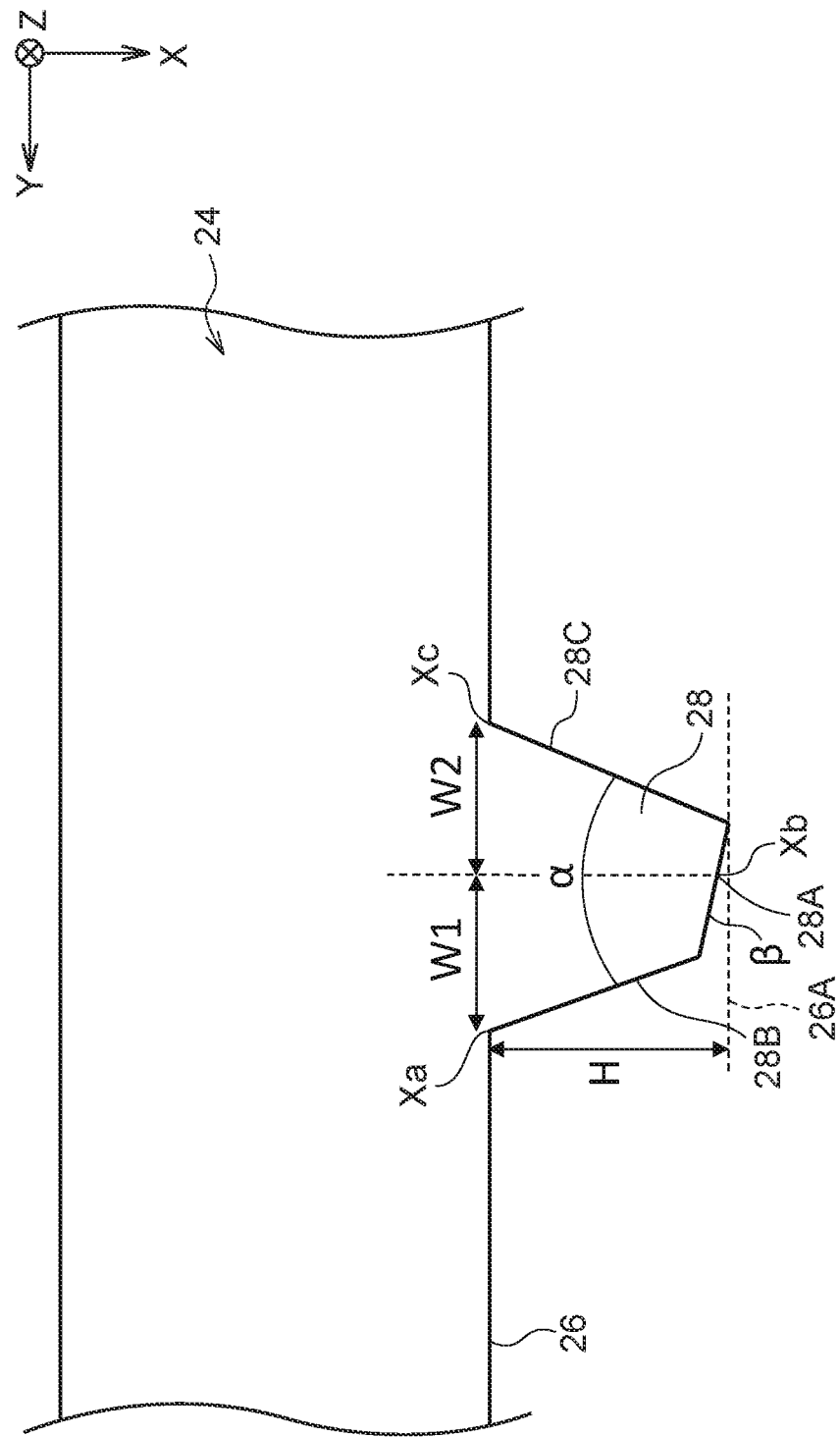
FIG. 17 is a schematic front view to explain a shape of a projecting portion according to a sixth exemplary embodiment.

FIG. 17 is a diagram illustrating a sixth exemplary embodiment of the present disclosure. Portions that are the same or equivalent to those of the first exemplary embodiment are appended with the same reference signs and description thereof is omitted. Only portions that differ from those of the first exemplary embodiment are described.

Namely, in the present exemplary embodiment, a shape of a projecting portion 28 differs from that of the first exemplary embodiment. The projecting portion 28 according to the present exemplary embodiment has a beveled cutting edge 28A, and the end face of the cutting edge 28A is inclined at an angle to a parallel line 26A parallel to a flat portion 26.

The present exemplary embodiment also enables similar advantageous effects to be obtained to those of the first exemplary embodiment.

Moreover, an effect to suppress damage to the cutting edge 28A is obtained irrespective of the angle β of the end face. Moreover, the cutting edge 28A may be implemented in combination with rounding as in the fifth exemplary embodiment.

Seventh Exemplary Embodiment

FIG. 18 is a diagram illustrating a seventh exemplary embodiment of the present disclosure. Portions that are the same or equivalent to those of the first exemplary embodiment are appended with the same reference signs and description thereof is omitted. Only portions that differ from those of the first exemplary embodiment are described.

Namely, in the present exemplary embodiment, a shape of a projecting portion 28 differs from that of the first exemplary embodiment. The projecting portion 28 according to the present exemplary embodiment is inclined such that a projection dimension H gets smaller on progression away from the die 20 in the Z axis direction, and an inclination angle between a ridgeline of the projecting portion 28 and a parallel line 26A parallel to a flat portion 26 is set to an inclination angle γ.

The present exemplary embodiment also enables similar advantageous effects to be obtained to those of the first exemplary embodiment.

Moreover, the greater the inclination angle γ of the ridgeline of the projecting portion 28, the higher the residual stress reduction effect; however, the risk of damage to the cutting edge 28A is raised thereby.

Eighth Exemplary Embodiment

FIG. 19 is a diagram illustrating an eighth exemplary embodiment of the present disclosure. Portions that are the same or equivalent to those of the first exemplary embodiment are appended with the same reference signs and description thereof is omitted. Only portions that differ from those of the first exemplary embodiment are described.

Namely, in the present exemplary embodiment, a shape of a projecting portion 28 differs from that of the first exemplary embodiment. The projecting portion 28 according to the present exemplary embodiment is configured such that a projection dimension H gets smaller on progression away from the die 20 in the Z axis direction. The rate of reduction in the projection dimension H of the projecting portion 28 gets smaller on progression in a direction away from the die 20, such that the ridgeline of the projecting portion 28 is curved in the length direction of the projecting portion 28, this being the Z axis direction.

The present exemplary embodiment also enables similar advantageous effects to be obtained to those of the first exemplary embodiment, and enables similar advantageous effects to be obtained to those of the seventh exemplary embodiment.

Note that although in the first to the eighth exemplary embodiment examples have been described of cases in which the workpiece 12 is cut, there is no limitation thereto. For example, an opening section may be provided in the upper face 20B of the die 20 with the shape of the opening section being a shape into which a punch 24 is insertable, and then a hole pierced in the workpiece 12 using shearing force from the punch 24 and the die 20. When doing so, the workpiece 12 may be used as a product, and the member punched out may also be used as a product.

Next description follows regarding Examples of the present disclosure.

EXAMPLES

As the workpiece 12, a steel sheet configured from welding together a 780 MPa grade steel sheet and a 1180 MPa grade steel sheet (referred to below as a "780-1180 member") may be employed. The thickness dimension T12 of the workpiece 12 was 1.6 mm.

The cutting machine 10 illustrated in FIG. 1 to FIG. 4 of the first exemplary embodiment was employed in the shearing. A servo press machine was employed as the press mechanism of the cutting machine 10, and a lowering speed used for the punch 24 was 100 mm/s. The shape of the projecting portion 28 of the punch 24 was a rounded shape configured with the cutting edge 28A having the curved face of the sixth exemplary embodiment as illustrated in FIG. 16. The projecting portion 28 was set with W1=2 mm, W2=2 mm, H=2 mm, and the clearance 38 was 10% of the thickness dimension of the workpiece 12 (1.6 mm). Note that the workpiece 12 will now be described using the reference signs allocated in FIG. 6.

Sheared members were acquired for workpieces 12 shifted toward the one S1 side with respect to the center of the cutting edge 28A and sheared at each respective 0.3 mm interval over a range from a position where the second boundary 36 of the respective workpiece 12 was aligned with the center of the cutting edge 28A of the projecting portion 28 (a=0) to a position where the second boundary 36 was shifted 3 mm with respect to the center of the cutting edge 28A (a=3).

After shearing, the residual stress was measured at the weld portion 18 of the sheared faces of each of the sheared members. Moreover, immersion tests were performed in which the sheared members were immersed in thiocyanic acid solution at a concentration of from 1 g/L to 100 g/L to investigate the hydrogen embrittlement properties after shearing.

FIG. 20 illustrates the measurement results of residual stress at the sheared faces after shearing. The horizontal axis indicates the distance along the width direction of the workpiece 12 (the Y axis direction) between the position at the center of the cutting edge 28A of the projecting portion 28 and the second boundary 36 between the weld portion 18 and the second heat-affected zone 32. The vertical axis indicates the measured values of residual stress on the sheared faces at the second boundary 36.

The residual stress referred to here is that found by measuring changes in lattice spacing on the sheared faces using X-ray diffractometry.

The results were that the residual stress was minimized when sheared with the position of the center of the cutting edge 28A of the projecting portion 28 was aligned with the second boundary 36. Moreover, the residual stress increased as the second boundary 36 moved away from the position at the center of the cutting edge 28A of the projecting portion 28, and a significant residual stress reduction effect was apparent as far as a=2 mm.

Table 1 illustrates the results of immersion tests using ammonium thiocyanate.

TABLE 1

| Thiocyanate concentration | Without projecting portion | Length between central axis of projecting portion and boundary between heat-affected zone and weld portion = 0 mm | Length between central axis of projecting portion and boundary between heat-affected zone and weld portion = 1 mm | Length between central axis of projecting portion and boundary between heat-affected zone and weld portion = 2 mm | Length between central axis of projecting portion and boundary between heat-affected zone and weld portion = 3 mm |
|---|---|---|---|---|---|
| 1 g/L | ○ | ○ | ○ | ○ | ○ |
| 10 g/L | X | ○ | ○ | ○ | X |
| 50 g/L | X | ○ | ○ | ○ | X |
| 100 g/L | X | ○ | ○ | X | X |

○ = No cracking
X = Cracking

In the tests in which there was no projecting portion 28 provided, and shearing was performed with a punch 24 having only a flat portion 26, hydrogen embrittlement cracking appeared at the second boundary 36 between the weld portion 18 and the second heat-affected zone 32 after immersion in ammonium thiocyanate at a concentration of 1 g/L for 72 hours. However, the generation of hydrogen embrittlement cracking was suppressed by providing the projecting portion 28 on the punch 24.

The effect of the projecting portion 28 in such cases differed according to the distance between the position of the center of the cutting edge 28A of the projecting portion 28 and the second boundary 36. The smaller the distance between the position of the center of the cutting edge 28A of the projecting portion 28 and the second boundary 36, the greater the hydrogen embrittlement cracking suppressing effect, and the higher the concentration of ammonium thiocyanate in which immersion could be performed without generation of hydrogen embrittlement cracking.

Note that the effect of the projecting portion 28 in the immersion tests with ammonium thiocyanate was only measured by whether or not there was hydrogen embrittlement cracking at the second boundary 36. These test results confirmed this effect over a range from 0 mm to 2 mm for the distance between the position of the center of the cutting edge 28A of the projecting portion 28 and the second boundary 36.

LIST OF REFERENCE SIGNS

12 workpiece
14 first metal sheet
16 second metal sheet
18 weld portion
20 die
24 punch
26 flat portion
28 projecting portion
28A cutting edge
28B one face
28C other face
30 first heat-affected zone
32 second heat-affected zone
α angle
T12 Thickness dimension

SUPPLEMENT

The following aspects may be summarized from the present specification.

Namely, a cutting method using a stamping press, the cutting method comprising: for a workpiece comprising a first metal sheet and a second metal sheet joined at a weld portion, and a heat-affected zone around the weld portion, positioning the workpiece at a position relative to a punch, the punch including a projecting portion that projects further toward the workpiece than a flat portion of the punch, such that the projecting portion starts to cut one or more of the heat-affected zone or the weld portion before the flat portion cuts the workpiece; and cutting the workpiece by moving the punch and a die relative to each other at the position at which the workpiece is positioned, so as to shear across the weld portion of the workpiece.

In a stamping press cutting method of a second aspect, further to the first aspect, the workpiece is positioned relative to the punch at a position at which the projecting portion starts to shear the heat-affected zone and the weld portion, which are mutually adjacent, before the flat portion cuts the workpiece, whereby the workpiece is sheared and cut.

In a stamping press cutting method of a third aspect, further to the first aspect or the second aspect, the workpiece is positioned relative to the punch at a position at which the projecting portion starts to shear the weld portion and the heat-affected zone, which is formed at both sides of the weld portion, before the flat portion cuts the workpiece, whereby the workpiece is sheared and cut.

In a stamping press cutting method of a fourth aspect, further to any one of the first aspect to the third aspect, the projecting portion of the punch has a projection dimension from the flat portion of not less than 10% of a thickness dimension of the workpiece.

In a stamping press cutting method of a fifth aspect, further to any one of the first aspect to the fourth aspect, the projecting portion of the punch has a projection dimension from the flat portion of not less than 50% of the thickness dimension of the workpiece.

In a stamping press cutting method of a sixth aspect, further to any one of the first aspect to the fifth aspect, the projecting portion of the punch has a wedge shape with a width dimension that progressively narrows towards the projecting direction, with an angle formed between one face at one width direction side of the projecting portion and another face at another side of the projecting portion of from 10 degrees to 170 degrees; and the cutting is performed with the width direction oriented in a direction along which the first metal sheet and the second metal sheet are arrayed.

In a stamping press cutting method of a seventh aspect, further to the sixth aspect, in the punch, the angle formed between the one face and the other face is not greater than 120 degrees.

In a stamping press cutting method of an eighth aspect, further to the sixth aspect or the seventh aspect, the projecting portion of the punch has a tip configured by a curved face.

In a stamping press cutting method of a ninth aspect, further to any one of the first aspect to the eighth aspect, the projecting portion of the punch includes a ridgeline extending along the flat portion, and a projection dimension of the projecting portion progressively decreases in a direction away from the die.

Moreover, the following other aspects may be summarized from the present specification.

A first other aspect is "a shearing method for metal sheet, the shearing method being a method employing a punch that includes a projecting portion with a wedge shaped cutting edge and a die into which the punch is inserted, and shearing a workpiece including a weld portion by abutting the projecting portion against the weld portion of the workpiece and dividing the workpiece".

A second other aspect is "the metal sheet shearing method of the first other aspect, wherein the projecting portion includes a pair of taper faces that approach a central axis in a length direction of the punch, on progression from a base end portion toward a cutting edge".

A third other aspect is "the first or the second other aspects, wherein an angle α formed between the pair of taper faces is from 10 degrees to 80 degrees".

A fourth other aspect is "the metal sheet shearing method of any one of the first to the third other aspects, wherein a clearance between the punch and a die is from 0.5% to 20% of a thickness of the workpiece".

A fifth other aspect is "the metal sheet shearing method of any one of the first to the fourth other aspects, wherein the cutting edge is a flat portion extending in a direction orthogonal to a hole piercing direction".

A fifth other aspect is "the metal sheet shearing method of any one of the first to the fourth other aspects, wherein a shape of the cutting edge is a rounded shape".

The entire disclosure of Japanese Patent Application No. 2015-189830 filed on Sep. 28, 2015 is incorporated in the present specification by reference. Moreover, all publications, patent applications and technical standards mentioned in the present specification are incorporated by reference in the present specification to the same extent as if each individual publication, patent application, or technical standard was specifically and individually indicated to be incorporated by reference.

The invention claimed is:

1. A cutting method using a stamping press comprising a punch and die moveable relative to each other, wherein the punch has a flat portion with a cutting edge for shearing the workpiece in conjunction with the die, and a projecting portion extending in a direction perpendicular to the cutting edge of the flat portion, the cutting method comprising:
   providing a workpiece comprising:
      a first metal sheet having an abutting portion
      a second metal sheet having an abutting portion
      a weld portion joining the first and second metal sheet at the abutting portions; and
      heat affected zones formed on both sides of the weld portion
   positioning the workpiece relative to the punch such that the projecting portion is aligned with one or more of the weld portion or the heat-affected zone of the workpiece such that the projecting portion would contact one or more of the weld portion or heat affected zone before the cutting edge of the flat portion of the punch; and
   cutting the workpiece by moving the punch and a die relative to each other such that the projecting portion begins to cut one of the weld portion or heat affecting portion in a perpendicular direction before the cutting edge of the flat portion and the die shear the remainder of the work piece.

2. The stamping press cutting method of claim 1, wherein the workpiece is positioned relative to the punch at a position at which the projecting portion starts to shear the heat-affected zone and the weld portion, which are mutually adjacent, before the flat portion cuts the workpiece, whereby the workpiece is sheared and cut.

3. The stamping press cutting method of claim 1, wherein the workpiece is positioned relative to the punch at a position at which the projecting portion starts to shear the weld portion and the heat-affected zone, which is formed at both sides of the weld portion, before the flat portion cuts the workpiece, whereby the workpiece is sheared and cut.

4. The stamping press cutting method of claim 1, wherein the projecting portion of the punch has a projection dimension from the flat portion of not less than 10% of a thickness dimension of the workpiece.

5. The stamping press cutting method of claim 1, wherein the projecting portion of the punch has a projection dimension from the flat portion of not less than 50% of a thickness dimension of the workpiece.

6. The stamping press cutting method of claim 1, wherein, in the punch, the angle formed between the one face and the other face is not greater than 120 degrees.

7. The stamping press cutting method of claim 1, wherein the projecting portion of the punch has a tip configured by a curved face.

8. The stamping press cutting method of claim 1, wherein the projecting portion of the punch includes a ridgeline extending along the flat portion, and a projection dimension of the projecting portion progressively decreases in a direction away from the die.

* * * * *